(12) United States Patent
Marino et al.

(10) Patent No.: US 10,701,284 B2
(45) Date of Patent: Jun. 30, 2020

(54) DETERMINING STATE SIGNATURES FOR CONSUMER ELECTRONIC DEVICES COUPLED TO AN AUDIO/VIDEO SWITCH

(71) Applicant: Caavo Inc, Milpitas, CA (US)

(72) Inventors: Nino V. Marino, Alameda, CA (US); Ashish D. Aggarwal, Stevenson Ranch, CA (US); Sharath H. Satheesh, Bangalore (IN); Vinod K. Gopinath, Bangalore (IN)

(73) Assignee: Caavo Inc, Milpitas, CA (US)

( * ) Notice: Subject to any disclaimer, the term of this patent is extended or adjusted under 35 U.S.C. 154(b) by 65 days.

(21) Appl. No.: 15/892,215

(22) Filed: Feb. 8, 2018

(65) Prior Publication Data

US 2018/0234637 A1    Aug. 16, 2018

(30) Foreign Application Priority Data

Feb. 10, 2017  (IN) .............................. 201741004798

(51) Int. Cl.
*H04N 5/268* (2006.01)
*G06F 3/16* (2006.01)
(Continued)

(52) U.S. Cl.
CPC ............. *H04N 5/268* (2013.01); *G06F 3/167* (2013.01); *H04N 5/4403* (2013.01); *H04N 5/63* (2013.01);
(Continued)

(58) Field of Classification Search
CPC ........ H04N 5/268; H04N 5/4403; H04N 5/63; H04N 21/42203; H04N 21/43635; H04N 21/44227; H04N 21/4436; G06F 3/167
See application file for complete search history.

(56) References Cited

U.S. PATENT DOCUMENTS

| 5,338,218 A | 8/1994 | Haas |
| 5,414,344 A | 5/1995 | Chinn |

(Continued)

FOREIGN PATENT DOCUMENTS

| EP | 2385517 A1 | 11/2011 |
| EP | 2608563 A1 | 6/2013 |

(Continued)

OTHER PUBLICATIONS

Hitachi Ltd. et al., "High-Definition Multimedia Interface Specification Version 1.3a", HDMI Licensing, LLC , Nov. 10, 2006, 276 pages (refer pp. 173, 195-227).

(Continued)

*Primary Examiner* — Michael E Teitelbaum
(74) *Attorney, Agent, or Firm* — Fiala & Weaver P.L.L.C.

(57) ABSTRACT

Methods, systems, and apparatuses are described for automatically determining a state signature for consumer electronic device(s) coupled to a switching device and/or other devices communicatively coupled to the consumer electronic device(s). The state signature is indicative of functional state(s) in which the consumer electronic device(s) are in. Such states include a power state, a proximity state, a communication state, and/or an operational state of the consumer electronic device(s). Based on the state signature(s), the switching device may infer which of the consumer electronic device(s) the user would like to use (or is using) and cause action(s) to be performed. Such actions include automatically switching to the AV port(s) to which such consumer electronic device(s) are connected, transmitting command(s) to such consumer electronic device(s), transmitting a notification message to such consumer electronic device(s), etc.

20 Claims, 12 Drawing Sheets

(51) Int. Cl.
| | |
|---|---|
| *H04N 5/63* | (2006.01) |
| *H04N 21/443* | (2011.01) |
| *H04N 21/4363* | (2011.01) |
| *H04N 21/422* | (2011.01) |
| *H04N 21/442* | (2011.01) |
| *H04N 5/44* | (2011.01) |

(52) U.S. Cl.
CPC .. *H04N 21/42203* (2013.01); *H04N 21/43635* (2013.01); *H04N 21/4436* (2013.01); *H04N 21/44227* (2013.01); *H04N 21/44231* (2013.01)

(56) References Cited

U.S. PATENT DOCUMENTS

| | | | |
|---|---|---|---|
| 5,497,284 | A | 3/1996 | Le Van Suu |
| 5,554,049 | A | 9/1996 | Reynolds |
| 5,606,242 | A | 2/1997 | Hull et al. |
| 5,664,119 | A | 9/1997 | Jeffries et al. |
| 5,909,181 | A | 6/1999 | Golzmane |
| 5,926,006 | A | 7/1999 | Burroughs et al. |
| 5,955,869 | A | 9/1999 | Rathmann |
| 5,973,475 | A | 10/1999 | Combaluzier |
| 6,084,523 | A | 7/2000 | Gelnovatch et al. |
| 6,198,741 | B1 | 3/2001 | Yoshizawa et al. |
| 6,204,637 | B1 | 3/2001 | Rengan |
| 6,290,533 | B1 | 9/2001 | Major |
| 6,428,339 | B1 | 8/2002 | Davidson et al. |
| 6,461,176 | B1 | 10/2002 | Haas |
| 6,675,242 | B2 | 1/2004 | Benson et al. |
| 6,676,428 | B2 | 1/2004 | Burton |
| 6,898,620 | B1 | 5/2005 | Ludwig et al. |
| 7,016,173 | B2 | 3/2006 | Lee |
| 7,233,866 | B2 | 6/2007 | Iaquinangelo |
| 7,598,880 | B2 | 10/2009 | Powell et al. |
| 7,805,263 | B2 | 9/2010 | Mack |
| 8,019,999 | B2 | 9/2011 | Candelore |
| 8,040,888 | B1 | 10/2011 | MacAdam et al. |
| 8,097,985 | B2 | 1/2012 | Carson et al. |
| 8,199,258 | B2 * | 6/2012 | Tokoro .................. G09G 5/006 348/552 |
| 8,255,553 | B2 | 8/2012 | Dong et al. |
| 8,332,181 | B1 | 12/2012 | Liu et al. |
| 8,497,660 | B2 | 7/2013 | Soong et al. |
| 8,526,462 | B2 | 9/2013 | Lida |
| 8,615,332 | B2 | 12/2013 | Heilman et al. |
| 8,666,152 | B1 | 3/2014 | Ramanathan et al. |
| 8,736,226 | B2 | 5/2014 | Mukai et al. |
| 8,768,549 | B2 | 7/2014 | Erko et al. |
| 8,777,646 | B2 | 7/2014 | Doubt |
| 8,813,165 | B2 | 8/2014 | Klughart |
| 8,839,334 | B2 | 9/2014 | Lee |
| 9,013,206 | B2 | 4/2015 | Muller et al. |
| 9,071,046 | B2 | 6/2015 | Stevens et al. |
| 9,116,137 | B1 | 8/2015 | Gettings et al. |
| 9,146,595 | B2 | 9/2015 | Forutanpour et al. |
| 9,172,275 | B2 | 10/2015 | Bhakta |
| 9,178,570 | B2 | 11/2015 | Deluca |
| 9,202,650 | B2 | 12/2015 | Merrifield et al. |
| 9,213,327 | B1 | 12/2015 | Gettings et al. |
| 9,219,358 | B2 | 12/2015 | Elberbaum |
| 9,256,071 | B1 | 2/2016 | Spitzer |
| 9,285,430 | B2 | 3/2016 | Loftus et al. |
| 9,304,500 | B2 | 4/2016 | McMahon |
| 9,319,616 | B2 | 4/2016 | Chang et al. |
| 9,459,938 | B1 | 10/2016 | Denton et al. |
| 9,462,211 | B2 | 10/2016 | Nakajima et al. |
| 9,554,061 | B1 | 1/2017 | Proctor, Jr. et al. |
| 9,618,714 | B2 | 4/2017 | Murray |
| 9,709,607 | B2 | 7/2017 | Tan et al. |
| 9,712,486 | B2 | 7/2017 | Johnson et al. |
| 9,749,552 | B2 | 8/2017 | Gopinath et al. |
| 9,791,877 | B2 | 10/2017 | Aisa et al. |
| 9,837,817 | B2 | 12/2017 | Borean et al. |
| 2002/0097546 | A1 | 7/2002 | Weinberger |
| 2003/0043740 | A1 | 3/2003 | March et al. |
| 2003/0167171 | A1 | 9/2003 | Calderone et al. |
| 2004/0255329 | A1 | 12/2004 | Compton et al. |
| 2005/0086694 | A1 | 4/2005 | Hicks et al. |
| 2006/0049694 | A1 | 3/2006 | Kates |
| 2006/0109702 | A1 | 5/2006 | Weightman |
| 2006/0146184 | A1 | 7/2006 | Gillard et al. |
| 2007/0153132 | A1 | 7/2007 | Jong |
| 2007/0220150 | A1 | 9/2007 | Garg |
| 2007/0292135 | A1 | 12/2007 | Guo et al. |
| 2008/0120673 | A1 | 5/2008 | Dong et al. |
| 2009/0032325 | A1 | 2/2009 | Frieb-Preis et al. |
| 2009/0037040 | A1 | 2/2009 | Salmon et al. |
| 2009/0051824 | A1 * | 2/2009 | Satou .................. G08C 17/00 348/734 |
| 2009/0150589 | A1 | 6/2009 | Watarai et al. |
| 2009/0284656 | A1 * | 11/2009 | Suzuki ............... H04L 12/2809 348/554 |
| 2009/0325704 | A1 | 12/2009 | Tom et al. |
| 2010/0118193 | A1 | 5/2010 | Boyden et al. |
| 2011/0041154 | A1 | 2/2011 | Olson |
| 2011/0134330 | A1 | 6/2011 | Yu et al. |
| 2011/0157467 | A1 | 6/2011 | McRae |
| 2011/0161660 | A1 | 6/2011 | Zhang et al. |
| 2011/0300929 | A1 | 12/2011 | Tardif et al. |
| 2011/0317076 | A1 | 12/2011 | Chen et al. |
| 2012/0020647 | A1 | 1/2012 | Vogel |
| 2012/0036284 | A1 | 2/2012 | Tao et al. |
| 2012/0306655 | A1 | 12/2012 | Tan et al. |
| 2012/0316984 | A1 | 12/2012 | Glassman |
| 2013/0051584 | A1 | 2/2013 | Higuchi et al. |
| 2013/0057774 | A1 | 3/2013 | Yoshida et al. |
| 2013/0176243 | A1 | 7/2013 | BianRosa et al. |
| 2013/0282897 | A1 | 10/2013 | Siegel et al. |
| 2013/0299221 | A1 | 11/2013 | Oh et al. |
| 2014/0122059 | A1 | 5/2014 | Patel et al. |
| 2014/0132839 | A1 | 5/2014 | Chang et al. |
| 2014/0145689 | A1 | 5/2014 | Carlucci et al. |
| 2014/0169795 | A1 | 6/2014 | Clough |
| 2014/0220806 | A1 | 8/2014 | Liang |
| 2014/0270696 | A1 | 9/2014 | Banks |
| 2014/0280547 | A1 | 9/2014 | DeCusatis et al. |
| 2014/0312848 | A1 | 10/2014 | Alexander et al. |
| 2014/0347565 | A1 | 11/2014 | Fullam et al. |
| 2015/0043888 | A1 | 2/2015 | Bozarth et al. |
| 2015/0149366 | A1 | 5/2015 | Schafer et al. |
| 2015/0295808 | A1 | 10/2015 | O'Malley et al. |
| 2015/0326982 | A1 | 11/2015 | Sudan |
| 2015/0372485 | A1 | 12/2015 | Borean et al. |
| 2016/0023675 | A1 | 1/2016 | Hannah et al. |
| 2016/0044273 | A1 | 2/2016 | Thompson |
| 2016/0046199 | A1 | 2/2016 | Butler et al. |
| 2016/0065886 | A1 | 3/2016 | Bilbrey |
| 2016/0140075 | A1 | 5/2016 | Kashyap et al. |
| 2016/0141810 | A1 | 5/2016 | Kashyap et al. |
| 2016/0142647 | A1 | 5/2016 | Gopinath et al. |
| 2016/0142648 | A1 | 5/2016 | Gopinath et al. |
| 2016/0173807 | A1 | 6/2016 | Thompson |
| 2017/0019266 | A1 | 1/2017 | Lim et al. |
| 2017/0041554 | A1 | 2/2017 | Gopinath et al. |
| 2017/0059660 | A1 | 3/2017 | Morsillo et al. |
| 2017/0075410 | A1 | 3/2017 | Fossati |
| 2017/0139456 | A1 | 5/2017 | Alou |
| 2017/0140628 | A1 | 5/2017 | Purdham et al. |
| 2017/0180899 | A1 | 6/2017 | Proctor, Jr. |
| 2017/0244270 | A1 | 8/2017 | Waters |
| 2017/0272316 | A1 | 9/2017 | Johnson et al. |
| 2017/0287323 | A1 | 10/2017 | Einaudi et al. |
| 2017/0310905 | A1 | 10/2017 | Gopinath et al. |
| 2018/0010919 | A1 | 1/2018 | Huang et al. |

FOREIGN PATENT DOCUMENTS

| | | |
|---|---|---|
| JP | 2009-130680 A | 6/2009 |
| WO | 2013/045467 A1 | 4/2013 |
| WO | 2016/081624 A1 | 5/2016 |

(56) References Cited

FOREIGN PATENT DOCUMENTS

WO      2016/081636 A1      5/2016
WO      2018/148439 A1      8/2018

OTHER PUBLICATIONS

International Preliminary Report on Patentability received for PCT Patent Application No. PCT/US2015/061379, dated Jun. 1, 2017, 7 pages.
International Search Report and Written Opinion received for PCT Patent Application No. PCT/US2015/061379, dated Mar. 10, 2016, 10 Pages.
International Preliminary Report on Patentability received for PCT Patent Application No. PCT/US2015/061398, dated Jun. 1, 2017, 10 Pages.
International Search Report and Written Opinion received for PCT Patent Application No. PCT/US2015/061398, dated Feb. 12, 2016, 15 pages.
International Search Report and Written Opinion received for PCT Patent Application No. PCT/US2018/017463, dated Jul. 12, 2018, 13 pages.

\* cited by examiner

DETERMINING STATE SIGNATURES FOR CONSUMER ELECTRONIC DEVICES COUPLED TO AN AUDIO/VIDEO SWITCH

CROSS-REFERENCE TO RELATED APPLICATIONS

This application claims priority to Indian Provisional Patent Application No. 201741004798, filed Feb. 10, 2017, the entirety of which is incorporated by reference herein.

This application is also related to the following U.S. patent application, which is incorporated by reference herein:

U.S. patent application Ser. No. 14/945,079, filed on Nov. 18, 2015, and entitled "Auto Detection and Adaptive Configuration of HDMI Ports," which claims priority to U.S. Provisional Application No. 62/081,401, filed Nov. 18, 2014, the entirety of which is incorporated by reference;

U.S. patent application Ser. No. 14/945,201, filed on Nov. 18, 2015, herewith and entitled "Automatic Detection of a Power Status of an Electronic Device and Control Schemes Based Thereon," which claims priority to U.S. Provisional Application No. 62/081,397, filed Nov. 18, 2014, the entirety of which is incorporated by reference;

U.S. patent application Ser. No. 14/945,125, filed on Nov. 18, 2015 and entitled "Automatic Identification and Mapping of Consumer Electronic Devices to Ports on an HDMI Switch," which claims priority to U.S. Provisional Application No. 62/081,414, filed Nov. 18, 2014, the entirety of which is incorporated by reference; and U.S. patent application Ser. No. 15/476,776, filed on Mar. 31, 2017, and entitled "Audio/Video Synchronization Using a Device with Camera and Microphone," which claims priority to U.S. Provisional Application No. 62/317,153, filed Apr. 1, 2016, the entirety of which is incorporated by reference.

BACKGROUND

Technical Field

The present application relates to the control of media systems based on determined states of media devices.

Background Art

A typical entertainment system for a home theater may include several audio/video (A/V) devices connected to a display, such as a television (TV), which may be a high definition TV (HDTV) or other definition level. Many A/V devices have a high-speed high-definition media interface (HDMI) to allow transfer of high resolution video and audio from a source device (e.g., a digital video disc (DVD) player or cable set top box (STB)) to a sink device (e.g., the TV). An HDMI switch or repeater may be used to connect the different devices together. The HDMI source devices are connected to the inputs of the HDMI switch and the HDMI sink devices are connected to outputs of the HDMI switch.

In order to consume particular content (e.g., listen to music or watch a movie), the user may have to interact directly with one or more of the A/V devices to change settings, may interact with one or more remote controls to change A/V device settings, may change cable connections between A/V devices, etc. As such, the user has to keep track of numerous entertainment center configurations and settings.

BRIEF SUMMARY

Methods, systems, and apparatuses are described for the automatic determination of states of consumer electronic devices coupled to an A/V, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

Figure 1:
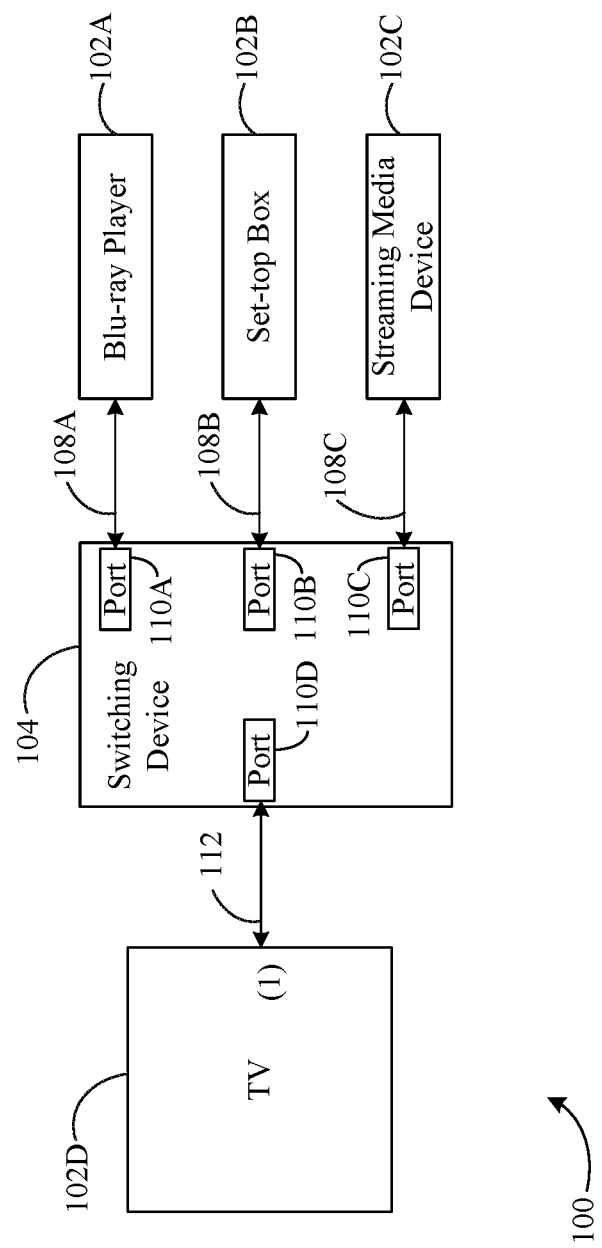
FIG. 1 is a block diagram of a media system configured to automatically determine states of consumer electronic devices coupled to a switching device, according to an exemplary embodiment.

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous exemplary embodiments are described herein. Any section/subsection headings provided herein are not intended to be limiting. Embodiments are described throughout this document, and each embodiment may be eligible for inclusion within multiple different sections or subsections. Furthermore, it is contemplated that the disclosed embodiments may be combined with each other in any manner. That is, the embodiments described herein are not mutually exclusive of each other and may be practiced and/or implemented alone, or in any combination.

Note that although embodiments are often described herein with respect to the HDMI (high-definition media interface) audio/video interface, such embodiments are also directed to other types of audio/video interfaces, including existing types of audio/video interfaces and audio/video interfaces to be developed in the future.

II. Example Embodiments

Embodiments are provided for automatically determining a state signature for one or more consumer electronic devices coupled to a switching device and/or other devices communicatively coupled to the consumer electronic device(s). The state signature is indicative of one or more functional states in which a consumer electronic device is in. Such states include a power state of the consumer electronic device, a proximity state of the proximity consumer electronic device, a communication state of the consumer electronic device, and/or an operational state of the consumer electronic device. Based on the determined state signature(s), the switching device may infer which consumer electronic device the user would like to use (or is using) and cause one or more actions to be performed. Such actions include, but are not limited to, automatically switching to the AV port(s) to which a consumer electronic device is connected, transmitting one or more commands to such a consumer electronic device (e.g., power on/off commands, operational commands (e.g., play/pause commands), transmitting a notification message to a consumer electronic device, further actions, combinations of actions, etc. It is noted that the aforementioned states and actions are purely exemplary and that the switching device may be configured to determine other states and/or perform other actions.

In particular, a method performed by a high-definition multimedia interface (HDMI)-based switching device comprising a plurality of HDMI ports is described. The method includes determining state characteristics of a consumer electronic device that is communicatively coupled to the HDMI switching device, determining a state signature of the consumer electronic device based on the determined state characteristics, identifying an action to be performed by the consumer electronic device from a plurality of actions based on the determined state signature and a data structure that comprises a state signature-to-action mapping, and causing the action to be performed with respect to at least one of the HDMI switching device or the consumer electronic device.

In accordance with one or more embodiments, said determining state characteristics of the consumer electronic device comprises detecting a voltage on a pin of an HDMI port of the plurality of HDMI ports to which the consumer electronic device is coupled, and identifying a power state of the consumer electronic device based on the detected voltage.

In accordance with one or more embodiments, said determining state characteristics of the consumer electronic device comprises determining whether the consumer electronic device is playing back at least one of video content or audio content, and identifying at least one of an operational state or a power state of the consumer electronic device based on the playing back determination.

In accordance with one or more embodiments, said determining state characteristics of the consumer electronic device comprises detecting a voice command intended for the consumer electronic device, and identifying at least one of an operational state or a power state of the consumer electronic device based on the detected voice command.

In accordance with one or more embodiments, said determining state characteristics of the consumer electronic device comprises monitoring a network, to which the HDMI-based switching device and the consumer electronic device are communicatively coupled, for network data received by the consumer electronic device, and identifying at least one of an operational state, a power state, or a communication state of the consumer electronic device based on said monitoring.

In accordance with one or more embodiments, said determining state characteristics of the consumer electronic device comprises detecting a command sent to the consumer electronic device from a remote control device, and identifying at least one of an operational state or a power state of the consumer electronic device based on the detected command.

In accordance with one or more embodiments, said determining state characteristics of the consumer electronic device comprises detecting a radio frequency signal from the consumer electronic device, and identifying at least one of a power state, an operational state or a proximity state of the consumer electronic device based on the detected radio frequency signal.

In accordance with one or more embodiments, said determining state characteristics of the consumer electronic device comprises determining an amount of current associated with or an amount of power consumed by the consumer electronic device, and identifying a power state based on the determined amount of current or the determined amount of power.

In accordance with one or more embodiments, said determining state characteristics of the consumer electronic device comprises sending a query to the consumer electronic device for a status, receiving a response from the consumer electronic device that includes the status, and identifying at least one of a power state or an operational state of the consumer electronic device based on the received response In accordance with one or more embodiments, the state signature of the consumer electronic device is based on at least one of a power state of the consumer electronic device, a proximity state of the consumer electronic device to another device, a communication state of the consumer electronic device, or an operational state of the consumer electronic device.

In accordance with one or more embodiments, said causing the action comprises at least one of transmitting a toggle command to the consumer electronic device to toggle a power state of the consumer electronic device, transmitting an operational command to the consumer electronic device that causes the consumer electronic to perform an operation specified by the operational command, automatically switching to an HDMI port of the plurality of HDMI ports to which the consumer electronic device is coupled, or transmitting a notification message to the consumer electronic device.

An HDMI-based switching device is also described herein. The HDMI-based switching device includes a plurality of HDMI ports, a characteristic identification component configured to determine a state characteristic of a consumer electronic device that is communicatively coupled to the HDMI-based switching device, a signature determination component configured to determine a state signature of the consumer electronic device based on the determined state characteristic, and an action determination component configured to identify an action to be performed by the consumer electronic device from a plurality of actions based on the determined state signature and a data structure that comprises a state signature-to-action mapping, and cause the action to be performed with respect to at least one of the HDMI-based switching device or the consumer electronic device In accordance with one or more embodiments, the characteristic identification component comprises a signal detector configured to determine the state characteristic, the signal detector configured to: detect a voltage on a pin of an HDMI port of the plurality of HDMI ports to which the consumer electronic device is coupled, and identify a power state of the consumer electronic device based on the detected voltage.

In accordance with one or more embodiments, the characteristic identification component comprises an audio/video detector configured to determine the state characteristic, the audio/video detector configured to determine whether the consumer electronic device is playing back at least one of video content or audio content, and identify at least one of an operational state or a power state of the consumer electronic device based on the playing back determination.

In accordance with one or more embodiments, the characteristic identification component comprises a user input monitor comprising a microphone and configured to determine the state characteristic, the user input monitor configured to detect a voice command intended for the consumer electronic device, and identify at least one of an operational state or a power state of the consumer electronic device based on the detected voice command.

In accordance with one or more embodiments, the characteristic identification component comprises a network monitor, the network monitor configured to determine the state characteristic, the network monitor configured to monitor a network to which the HDMI-based switching device and the consumer electronic device are communicatively coupled, for network data received by the consumer electronic device, and identify at least one of an operational state, a power state, or a communication state of the consumer electronic device based on said monitoring.

In accordance with one or more embodiments, the characteristic identification component comprises a remote signal detector, wherein the remote signal detector is configured to determine the state characteristic, the remote signal detector configured to: detect a command sent to the consumer electronic device from a remote control device, and identify at least one of an operational state or a power state of the consumer electronic device based on the detected command.

In accordance with one or more embodiments, the characteristic identification component comprises a proximity detector, wherein the proximity detector is configured to determine the state characteristic, the proximity detector configured to detect a radio frequency signal from the consumer electronic device, and identify at least one of a power state, an operational state or a proximity state of the consumer electronic device based on the detected radio frequency signal.

In accordance with one or more embodiments, the characteristic identification component comprises a power monitor configured to determine the state characteristic, wherein the power monitor is configured to determine an amount of current associated with or an amount of power consumed by the consumer electronic device and identify a power state based on the determined amount of current or the determined amount of power.

A system is further described herein. The system includes one or more processors and a memory containing computer-readable instructions, which, when executed by the one or more processors, is configured to perform operations in an HDMI-based switching device comprising a plurality of audio/video (AV) ports. The operations include determining state characteristics of a consumer electronic device that is communicatively coupled to the HDMI switching device, determining a state signature of the consumer electronic device based on the determined state characteristics, identifying an action to be performed by the consumer electronic device from a plurality of actions based on the determined state signature and a data structure that comprises a state signature-to-action mapping, and causing the action to be performed with respect to at least one of the HDMI switching device or the consumer electronic device.

III. Example HDMI Switch Embodiments

Systems and devices may be configured in various ways according to the embodiments and techniques described herein. In embodiments, an HDMI switch (or repeater or other device with HDMI connectors/ports) may be connected to one or more HDMI enabled devices. The HDMI switch or other device may be configured, according to embodiments, to automatically determine the states of HDMI enabled devices coupled to the HDMI switch.

FIG. 1 is a block diagram of a system 100 that includes a switching device 104 configured to automatically determine states of a plurality of consumer electronic devices 102A-102D connected thereto. Switching device 104 may be an HDMI-based switching device, but the embodiments disclosed herein are not so limited.

Consumer electronic devices 102A-102C are configured to provide audio and/or video signals (e.g., audio and/or video signals 108A, 108B, 108C, respectively) for playback and are referred to as "source" devices. Consumer electronic device 102D is configured to receive audio and/or video signals (e.g., audio and/or video signals 112) and is referred to as a "sink" device. As shown in FIG. 1, consumer electronic device 102A is coupled to a first AV port 110A of switching device 104, consumer electronic device 102B is coupled to a second AV port 110B of switching device 104, consumer electronic device 102C is coupled to a third AV port 110C of switching device 104, and consumer electronic device 102D is coupled to a fourth AV port 110D of switching device 104. In accordance with an embodiment, AV ports 110A-110D are HDMI ports. However, embodiments described herein are not so limited. As further shown in FIG. 1, consumer electronic device 102A is a Blu-ray player, consumer electronic device 102B is a set-top box, consumer electronic device 102C is a streaming media device, and consumer electronic device 102D is a TV.

Examples of a streaming media device include, but are not limited to, a Roku™ device, an AppleTV™ device, a Chromecast™, and the like. The depiction of these particular electronics devices is merely for illustrative purposes. It is noted that while FIG. 1 shows that switching device 104 includes four AV ports 110A-110D, switching device 104 may include any number of AV ports, and therefore, may be coupled to any number of consumer electronic devices.

Switching device 104 is configured to select (e.g., switch between) different audio and/or video source devices that are coupled to AV ports 110A-110C (e.g., consumer electronic device 102A, consumer electronic device 102B or consumer electronic device 102C) and provide an output signal (e.g., audio and/or video signals 112) comprising audio and/or video signals (e.g., audio and/or video signals 108A, audio and/or video signals 108B or audio and/or video signals 108C) provided by the selected audio/video source. Audio and/or video signals 112 are provided to consumer electronic device 102D that is coupled to AV port 110D. Audio and/or video signals 112 may also be provided to any other device capable of playing back audio and/or video signals (e.g., speakers) that may be coupled to AV port 102D and/or other port(s) (not shown) of switching device 104.

Each of AV ports 110A-110D may be configurable to be coupled to either a source device (e.g., consumer electronic device 102A, consumer electronic device 102B, or consumer electronic device 102C) or a sink device (e.g., consumer electronic device 102D). For example, switching device 104 may be configured to automatically determine whether an electronic device coupled to a particular AV port is a source device or a sink device. Based on that determination, switching device 104 may configure that AV port to be a source AV port or a sink AV port. Additional details regarding the auto-configuration of AV ports 110A-110D may be found in U.S. patent application Ser. No. 14/945,079, entitled "Auto Detection and Adaptive Configuration of HDMI Ports," the entirety of which is incorporated by reference herein.

Switching device 104 may also be configured to automatically identify (e.g., determine) the consumer electronic device coupled to each of AV ports 110A-110D. For example, for each consumer electronic device coupled to a particular AV port, switching device 104 may be configured to determine one or more identifiers of the consumer electronic device, such as, but not limited to, a type of the electronic device (e.g., a DVD player, a Blu-ray player, a video game console, a streaming media device, a TV, an HDTV, a projector, etc.), a brand name of the electronic device, a manufacturer of the electronic device, a model number of the electronic device, etc. The identifier(s) may be determined according to various techniques, such as, but not limited to: techniques based on HDMI consumer electronics control (CEC), identification via video data, identification via audio data, identification via IP network, remote control operation by a user, voice input from a user, and explicit device selection by a user. Upon determining the identifier(s), switching device 104 may be configured to map the identified electronic device to the AV port to which that electronic device is connected. This process may be referred to as "device-to-port mapping". Additional details regarding the identification of electronic device(s) and the mapping of electronic device(s) to AV port(s) may be found in U.S. patent application Ser. No. 14/945,125, entitled "Automatic Identification and Mapping of Consumer Electronic Devices to Ports on an HDMI Switch," the entirety of which is incorporated by reference.

Switching device 104 may be further configured to automatically determine a state signature for each of the consumer electronic device coupled thereto and/or other devices communicatively coupled to the consumer electronic device(s). The state signature is indicative one or more functional states in which the consumer electronic device(s) are in. Such states include a power state of the consumer electronic device(s), a proximity state of the proximity consumer electronic device(s), a communication state of the consumer electronic device(s), and/or an operational state of the consumer electronic device(s). Based on the determined state signature(s), switching device 104 may infer which of consumer electronic device(s) 102A-102D is the user who would like to use (or is using) and cause one or more actions to be performed. Such actions include, but are not limited to, automatically switching to the AV port(s) to which such consumer electronic device(s) are connected, transmitting one or more commands to such consumer electronic device(s) (e.g., power on/off commands, operational commands (e.g., play/pause commands)), transmitting a notification message to such consumer electronic device(s), etc.

Figure 2:
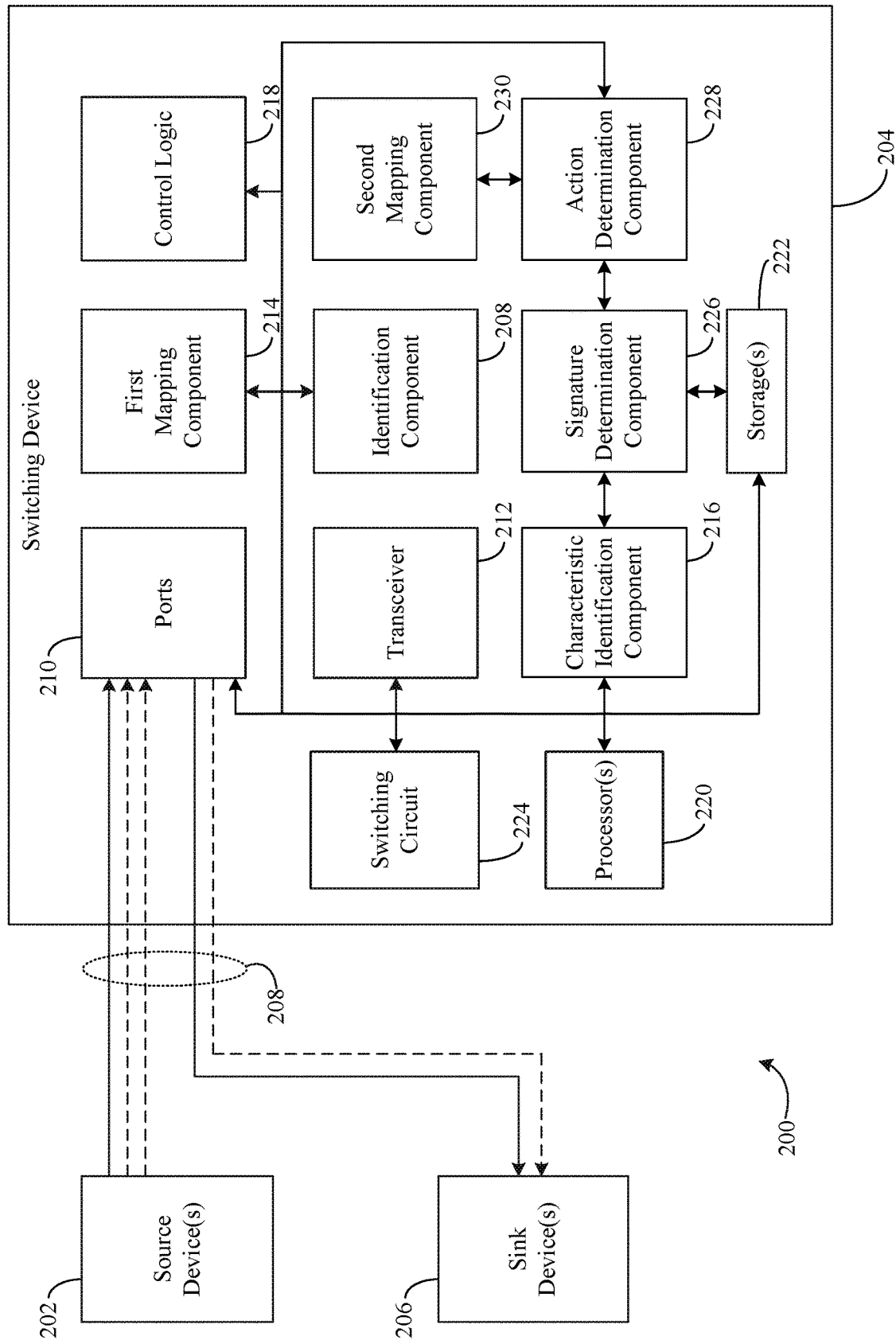
FIG. 2 is a block diagram of a switching device coupled to source and sink devices, and configured to perform control functions with respect to the source and sink devices based on determined states, according to an exemplary embodiment.

Turning now to FIG. 2, an exemplary implementation of a system 200 including a switching device 204 is shown. Switching device 204 is an example of switching device 104, as described above with reference to FIG. 1. Switching device 204 may include and/or encompass the embodiments described herein. That is, switching device 204 of FIG. 2 is configured to perform methods and/or functions as described in embodiments using components and/or sub-components of the described embodiments. For instance, switch 204 is configured to automatically determine state signature(s) for each source device and/or sink device coupled thereto via port(s) of switching device 204 and perform actions (e.g., control functions) based on the determined state signature(s), according to embodiments.

In embodiments, switching device 204 may include some or all of audio/video (A/V) ports 210, one or more storages 222, one or more processors 220, a transceiver 212, a first mapping component 214, control logic 218, a switching circuit 224, an identification component 208, a characteristic identification component 216, a signature determination component 226, an action determination component 228, and/or a second mapping component 230. Switching device 204 may be coupled to one or more source devices 202 and/or to one or more sink devices 206 via connections 208 (e.g., HDMI connections) as would be understood by persons of skill in the relevant art(s) having the benefit of this disclosure. Source device(s) 202 are examples of consumer electronic device(s) 102A-102C, and sink device(s) 206 are examples of consumer electronic device 102D.

A/V ports 210 may include one or more HDMI ports as described herein. A/V ports 210 may be dynamically configured as input ports or output ports according to the described embodiments. For instance, one or more of A/V ports 210 may be referred to as universal HDMI ports as these ports may be dynamically configured as inputs or outputs on connection of an HDMI device. In other words, in an embodiment, there is no need to pre-define the function of any port of A/V ports 210. Thus, the same physical port for A/V ports 210 can act as an input or an output depending on which type of HDMI device is connected, and this considerably enhances the convenience of use for switching device 204. The port interface scheme is such that a repeater device or a switch (e.g., switching device 204) is able to detect the type of device connected to the HDMI port and automatically configure the internal circuits to support either a sink or a source. Further details are found in aforementioned U.S. patent application Ser. No. 14/945,079, entitled "AUTO DETECTION AND ADAPTIVE CONFIGURATION OF HDMI PORTS."

Storage(s) 222 may be one or more of any storage device described herein, such as, but not limited to, those described below with respect to FIG. 22.

Processor(s) 220 may be one or more of any processing device or processor described herein, such as, but not limited to, those described below with respect to FIG. 22, and may be configured as described elsewhere herein.

Transceiver 212 is configured to receive and transmit wired and/or wireless data according to any protocol and/or embodiment described herein, such as HDMI in HDMI switch embodiments. For instance, transceiver 212 is configured to receive and to transmit audio/video signals according to HDMI protocols from HDMI sources and HDMI sinks respectively.

Identification component 208 may be implemented as hardware (e.g., electrical circuits), or hardware that executes one or both of software (e.g., as executed by a processor or processing device) and firmware. Identification component 208 is configured to operate and perform functions according to the embodiments described herein. For example, identification component 208 may be configured to identify the consumer electronic device (e.g., source device(s) 202 or sink device(s) 206) coupled to each port of AV ports 210. For example, for each source device(s) 202 and/or sink device(s) 206, identification component 208 may be configured to determine identifier(s) thereof, such as, but not limited to a type of the device (e.g., a DVD player, a Blu-ray player, a video game console, a streaming media device, a TV, an HDTV, a projector, etc.), a brand name of the device, a manufacturer of the device, a model number of the device, etc. The identifier(s) may be determined according to various techniques, such as, but not limited to: techniques based on HDMI consumer electronics control (CEC), identification via video data, identification via audio data, identification via IP network, remote control operation by a user, voice input from a user, and explicit device selection by a user. Identification component 208 outputs the identifier(s), which is/are received by first mapping component 214.

First mapping component 214 may be implemented as hardware (e.g., electrical circuits), or hardware that executes one or both of software (e.g., as executed by a processor or processing device) and firmware. First mapping component 214 is configured to operate and perform functions according to the embodiments described herein. First mapping component 214 is configured to determine a device-to-port mapping based on the identifier(s) received from identification component 208. For example, first mapping component 214 may generate a data structure (e.g., a table, a map, an array, etc.) that associates the identifier(s) for any given identified device to the AV port to which that electronic device is coupled. In this way, the device-to-port mapping may indicate that a first source device (e.g., a Blu-ray player) is coupled to a first AV port (e.g., AV Port 1), that a second source device (e.g., a set-top box) is coupled to a second AV port (e.g., AV Port 2), and that a third source device (e.g., a TV) is coupled to a third AV port (e.g., AV Port 3).

Additional details regarding the identification of electronic device(s) and the mapping of electronic device(s) to AV port(s) may be found in the aforementioned U.S. patent application Ser. No. 14/945,125, entitled "Automatic Identification and Mapping of Consumer Electronic Devices to Ports on an HDMI Switch."

Control logic 218 receives the mapping generated by first mapping component 214 and optionally receives the identifiers generated by identification component 208. Based at least in part on the identifiers and mappings, control logic 218 is configured to generate a control signal that is received by switching circuit 224 and/or transceiver 212, configured to cause switching circuit 224 to connect the identified source device(s) 202 and/or sink device(s) 206 on port(s) of A/V ports 210 to corresponding receiver portions or transmitter portions of transceiver 212 and/or causing transceiver 212 to output desired content received from source device(s) 202 on a specified output port of A/V ports 210.

Switching circuit 224 may be implemented as hardware (e.g., electrical circuits), or hardware that executes one or both of software (e.g., as executed by a processor or processing device) and firmware. Switching circuit 224 is configured to operate and perform functions according to the embodiments described herein. For example, switching circuit 224 is configured to provide switched connections between A/V ports 210 and transceiver 212. That is, switching circuit 224 may provide a connection between any port of ports 210 and any receiver component or transmitter component of transceiver 212. Switching circuit 224 may comprise one or more switch circuit portions (e.g., comprising one or more switches/switching elements) and may be combined or used in conjunction with other portions of system 200.

Characteristic identification component 216 may be implemented as hardware (e.g., electrical circuits), or hardware that executes one or both of software (e.g., as executed by a processor or processing device) and firmware. Characteristic identification component 216 is configured to operate and perform functions according to the embodiments described herein. For example, characteristic identification component 216 may be configured to determine a plurality of state characteristics associated with the source device(s) 202 and sink device(s) 206 connected to or coupled with switching device 204. The state characteristics may be determined based on audio/video signaling information, the content being played back by sink device(s) 206, network communications associated with source device(s) 202 and/or sink device(s) 206, detected remote control signals, power consumption associated with source device(s) 202 and/or sink device(s) 206, network data usage associated with source device(s) 202 and/or sink device(s) 206, the proximity of consumer electronic devices to switching device 204, status information received from source device(s) 202 and/or sink device(s) 206, and/or other technique. Characteristic identification component 216 may comprise one or more components for determining such state characteristics.

Figure 3:
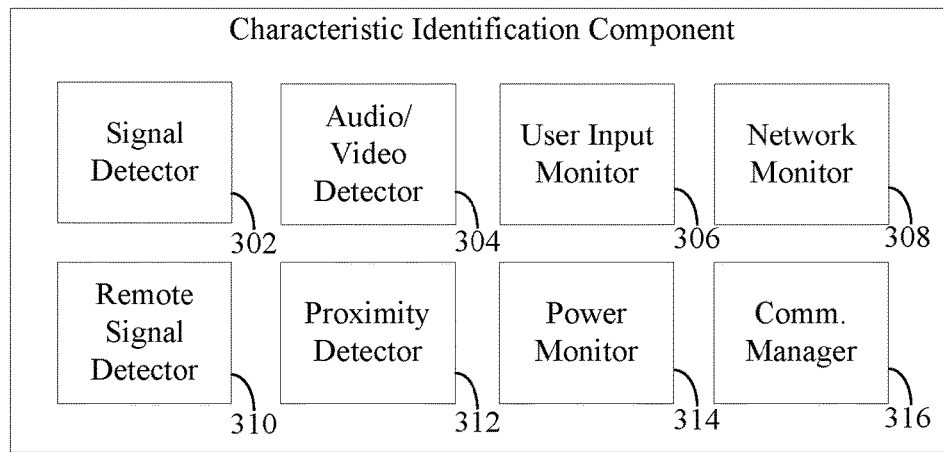
FIG. 3 is a block diagram of a characteristic identification component, according to an exemplary embodiment.

For example, referring to FIG. 3, FIG. 3 is a block diagram of characteristic identification component 300 in accordance with an example embodiment. Characteristic identification component 300 is an example of characteristic identification component 216, as shown in FIG. 2. As shown in FIG. 3, characteristic identification component 300 comprises a signal detector 302, an audio/video detector 304, a user input monitor 306, a network monitor 308, a remote signal detector 310, a proximity detector 312, a power monitor 314, and a communication manager 316. In embodiments, characteristic identification component 300 may include any one or more of these elements in any combination. These elements of characteristic identification component 300 are described as follows.

Signal detector 302 may be implemented as hardware (e.g., electrical circuits), or hardware that executes one or both of software (e.g., as executed by a processor or processing device) and firmware. Signal detector 302 is configured to operate and perform functions according to the embodiments described herein. For example, signal detector 302 may be configured to detect or determine whether a consumer electronic device (e.g., source device(s) 202 and/or sink device(s) 206) is powered on or off. This characteristic is indicative of a power state of the consumer electronic device. For example, when a consumer electronic device is connected to a port (e.g., port 210) of switching device 204, the consumer electronic device may provide a voltage to a particular pin of that port. For example, in an embodiment in which ports 210 are HDMI ports, source device(s) 202 may provide a voltage to the +5V pin of the HDMI port to which it is coupled, and sink device(s) 206 may provide a voltage to the hot-plug detect (HPD) pin of the HDMI port to which it is coupled. Signal detector 302 may monitor these pins to determine whether source device(s) 202 and/or sink device(s) 206 are in a power on state, a power off state, a standby state, etc. These determined characteristics are provided to signature determination component 226 (as shown in FIG. 2). Additional details regarding signal detector 302 are described below with reference to FIGS. 5 and 6.

Audio/video detector 304 may be implemented as hardware (e.g., electrical circuits), or hardware that executes one or both of software (e.g., as executed by a processor or processing device) and firmware. Audio/video detector 304 is configured to operate and perform functions according to the embodiments described herein. For example, audio/video detector 304 may be configured to detect whether a device (e.g., source device(s) 202 and/or sink device(s) 206) is playing back content (e.g., video and/or audio), whether it is in a pause mode, whether it is displaying a particular graphical user interface (GUI) screen (e.g., a home screen), etc. This characteristic is indicative of an operational state of such device(s). In embodiments, audio/video detector 304 is configured to analyze audio/video signals that are to be provided to sink device(s) 206 for playback thereby via the A/V port(s) to which sink device(s) 206 are connected. Audio/video detector 304 may determine the power state and/or operational state of sink device(s) 206 based on analyzing the audio/video signals.

Alternatively, the content being played back via sink device(s) 206 may be recorded (e.g., by taking one or more images of the display of sink device(s) 206 and/or recording audio being played back by sink device(s) 206) using an electronic device incorporated in or separate from audio/video detector 304. Any external electronic device such as or including a microphone and/or a camera or a video camera may be used to perform the screen capture or audio recording, such as a smart phone, a remote control, etc., and this external device may relay this recorded information to audio/video detector 304. Alternatively, switching device 204 may directly incorporate the microphone and/or camera. After receiving the recorded audio/video input information, an analysis can be performed by audio/video detector 304 on the recorded data to determine whether sink device(s) 206 are playing a video, or a sound, both, or nothing at all. Through the analysis of the recorded data, audio/video detector 304 may determine the power state and/or operational state of consumer electronic device(s).

The foregoing characteristics determined by audio/video detector 304 are provided to signature determination component 226 (as shown in FIG. 2). Additional details regarding audio/video detector 304 are described below with reference to FIGS. 7 and 8.

User input monitor 306 may be implemented as hardware (e.g., electrical circuits), or hardware that executes one or both of software (e.g., as executed by a processor or processing device) and firmware. User input monitor 306 is configured to operate and perform functions according to the embodiments described herein. For example, user input monitor 306 may be configured to identify a characteristic of the consumer electronic device based on user input. This characteristic may be indicative of an intent of the user regarding the consumer electronic device. For example, user input monitor 306 may monitor for a voice command from a user to determine whether a user is attempting to control source device(s) 202 and/or sink device(s) 206. The voice command may be interpreted by user input monitor 306 to derive the characteristic. For example, if the voice command is "turn TV on," then user input monitor 306 may infer that the power state of the TV is "on." User input monitor 306 may receive user commands via one or more of any suitable user interface element described elsewhere herein or otherwise known, including a keypad, a keyboard, a touch screen, a microphone (for voice commands), a camera, etc. The foregoing characteristics determined by user input monitor 306 are provided to signature determination component 226 (as shown in FIG. 2). Additional details regarding user input monitor 306 are described below with reference to FIGS. 9 and 10.

Network monitor 308 may be implemented as hardware (e.g., electrical circuits), or hardware that executes one or both of software (e.g., as executed by a processor or processing device) and firmware. Network monitor 308 is configured to operate and perform functions according to the embodiments described herein. For example, network monitor 308 may be configured to identify a characteristic of the consumer electronic device based on network communications. This characteristic may be indicative of a communication state of one or more consumer electronic devices. For example, network monitor 308 may monitor at least one network (e.g., a Bluetooth® network, a Wi-Fi network, an Ethernet network, a ZigBee® network, etc.) to determine if two consumer electronic devices are communicating with each other, and to interpret such communication. In embodiments, network monitor 308 may monitor the data usage of source device(s) 202 and/or sink device(s) 206 to determine whether such device(s) are streaming content. In these cases, the power state and/or operational state characteristic of such device(s) may be determined (e.g., a device is on and playing content) in addition to the communication state characteristic. For example, when source device(s) 202 and/or a sink device(s) 206 are consuming a large amount of data over the network, this may indicate that such device(s) are streaming music or video. In another example, if network monitor 308 determines that a mobile device (such as a smart phone) is attempting to communicate with a device configured to stream content (e.g., a media streaming device, such as, but not limited to, Chromecast®, AppleTV®, Amazon FireTV®, etc.), then network monitor 308 may identify the mobile device and the media streaming device as two devices attempting to connect to each other. In another example, if a mobile device is attempting to communicate with a sink device coupled to switching device 204 (e.g., a Sonos® speaker system), then network monitor 308 may identify the mobile device and the sink device as two devices wanting to connect to each other. The foregoing characteristics determined by network monitor 308 are provided to signature determination component 226 (as shown in FIG. 2). Additional details regarding network monitor 308 are described below with reference to FIGS. 11 and 12.

Remote signal detector 310 may be implemented as hardware (e.g., electrical circuits), or hardware that executes one or both of software (e.g., as executed by a processor or processing device) and firmware. Remote signal detector 310 is configured to operate and perform functions according to the embodiments described herein. For example, remote signal detector 310 is configured to identify a characteristic of the consumer electronic device based on signaling information transmitted by a remote control device. For example, remote signal detector 310 may sniff (i.e., detect) wireless control signals transmitted by a remote control and that are intended for source device(s) 202 and/or sink device(s) 206. The wireless control signals may be infrared (IR)-based, radio frequency (RF)-based and/or internet protocol (IP)-based control signals. Detection of such signals may indicate whether a particular source device and/or sink device is being controlled by a remote control device. The characteristics that may be inferred based on detection of such control signals may include a power state characteristic an operational mode characteristic, and/or a communication state of the source device and/or sink device for which the control signal was intended. For example, when a user interacts with (e.g., pushes) a button on a remote control associated with an HDTV sink device, remote signal detector 310 may detect the control signal transmitted as a result of the user's interaction with the button and analyze the control signal to determine the operation to be performed by the HDTV that is specified by the control signal. For example, if the user pushes a "Fast Forward" button, then remote signal detector 310 may infer that the HDTV is powered on and its operational state is a fast forward mode. The foregoing characteristics determined by remote signal detector 310 are provided to signature determination component 226 (as shown in FIG. 2). Additional details regarding remote signal detector 310 are described below with reference to FIGS. 13 and 14.

Proximity detector 312 may be implemented as hardware (e.g., electrical circuits), or hardware that executes one or both of software (e.g., as executed by a processor or processing device) and firmware. Proximity detector 312 is configured to operate and perform functions according to the embodiments described herein. For example, proximity detector 312 may be configured to identify a proximity (nearness) of a mobile device relative to switching device 204. This characteristic may indicate a proximity state. Switching device 204 may include an antenna for receiving wireless signal from the mobile device, and other device, such as source device(s) 202 and/or sink device(s) 206. The wireless signals may be in accordance with any wireless protocol, including, but not limited to, Bluetooth® low energy (BLE), near field communication (NFC) or other RF-based protocols. In embodiments, proximity detector 312 may detect and/or monitor wireless signals transmitted from mobile device(s) for information such as power received and/or signal strength to determine the distance between each of mobile device(s) and switching device 304. Proximity detector 312 may continuously monitor the power received and/or signal strength to generate and/or update a distance profile for each of mobile device(s), which each specify the present distance between a particular mobile device and switching device 204. The distance profile for a particular mobile device may be referred to as a proximity state characteristic. The proximity state characteristics determined by proximity detector 312 are provided to signature determination component 226 (as shown in FIG. 2). Additional details regarding proximity detector 312 are described below with reference to FIGS. 15 and 16.

Power monitor 314 may be implemented as hardware (e.g., electrical circuits), or hardware that executes one or both of software (e.g., as executed by a processor or processing device) and firmware. Power monitor 314 is configured to operate and perform functions according to the embodiments described herein. For example, power monitor 314 may be configured to identify an amount of current provided to and/or the amount of power consumed by source device(s) 202 and/or sink device(s) 206. This power characteristic may indicate a power state of source device(s) 202 and/or sink device(s) 206. In embodiments, for example, power monitor 314 may determine whether source device(s) 202 and/or sink device(s) 206 is in a power-off state, a power-on state, a standby state, etc., based on the amount of current provided to and/or the amount of power consumed by source device(s) 202 and/or sink device(s) 206. In embodiments, power monitor 314 may monitor the power consumption of a particular source device or sink device via a socket device coupled between the particular device and a wall power socket to which the particular device is coupled. The socket device may wirelessly communicate with switching device 204 to inform power monitor 314 of the amount of current provided to and/or the amount of power consumed by the particular device. In embodiments, power monitor 314 may also monitor determine a power state of device coupled to source device(s) 202 and/or sink device(s) 206 (e.g., a USB device connected as a USB dongle or via a cable to a USB port of the source or sink device) to infer the power state of the source or sink device. When certain source and/or sink devices cease consuming power, any USB devices connected to such devices also cease consume powering by virtue of power no longer being provided to the USB port(s) of such devices. Accordingly, the power state of the source or sink device may be inferred based on the power state of the USB device attached to source device(s) 202 and/or sink device(s) 206. In certain embodiments, the power monitor may, alternatively or in addition, monitor the power consumption of a remote control device associated with a particular source device or sink device to determine whether such a device is being used. When a button is pressed on a remote control, the remote control may consume much more power than when no button is being pressed. Therefore, by monitoring the power consumed by the remote control device, the power state of the remote control and its associated source or sink device may be determined.

The power state characteristics determined by power monitor 314 are provided to signature determination component 226 (as shown in FIG. 2). Additional details regarding power monitor 314 are described below with reference to FIGS. 17 and 18.

Communication manager 316 may be implemented as hardware (e.g., electrical circuits), or hardware that executes one or both of software (e.g., as executed by a processor or processing device) and firmware. Communication manager 316 is configured to operate and perform functions according to the embodiments described herein. For example, communication manager 316 may be configured to query source device(s) 202 and/or sink device(s) 206 for a status, to receive a response from source device(s) 202 and/or sink device(s) 206 that includes the status, and to identify a characteristic of source device(s) 202 and/or sink device(s) 206 based on the received response. For example, communication manager 316 may directly communicate with source device(s) 202 and/or sink device(s) 206 to query their statuses (e.g., their power states, operational states, communication states, etc.) rather than having to infer/determine their statuses/states with the techniques discussed above. Communication manager 316 may communicate with a source device(s) 202 and/or sink device(s) 206 through various methods, such as through consumer electronics control (CEC) over HDMI, IP-based communication protocols, and/or RF-based communication protocols. The characteristics determined by communication manager 316 are provided to signature determination component 226 (as shown in FIG. 2). Additional details regarding communication manager 316 are described below with reference to FIGS. 19 and 20.

Referring again to FIG. 2, signature determination component 226 may be implemented as hardware (e.g., electrical circuits), or hardware that executes one or both of software (e.g., as executed by a processor or processing device) and firmware. Signature determination component 226 is configured to operate and perform functions according to the embodiments described herein. For example, signature determination component 226 may be configured to analyze the plurality of characteristics determined for source device(s) 202 and/or sink device(s) 206 by characteristic identification 216 to determine a state signature for each of source device(s) 202 and/or sink device(s) 206. The state signature for each device may specify the one or more states in which that device is presently in. The states may include any number of types of states, including a power state of the device, a proximity of the device to another device (e.g., switching device 204 and/or another device coupled thereto), a communication state of the device, or an operational state (e.g., pause, play, stop, rewind, fast forward), of the device. It is noted that this listing is not intended to be limiting as there may be other states of source device(s) 202 and/or sink device(s) 206 (or other device(s), such as mobile devices operable to communicate with switching device 204) that may be determined. The analysis performed by signature determination component 226 may include gathering, storing, and/or combining all the identified characteristics associated with the consumer electronic device in storage(s) 222 to generate a collective state signature for each of source device(s) 202, sink device(s) 206 and/or other device(s) operable to communicate with switching device 204.

In an embodiment, signature determination component 226 may receive multiple characteristics associated with the same state from more than one component (e.g., signal detector 302, audio video detector 304, user input monitor 306, network monitor 308, remote signal detector 310, proximity detector 312, power monitor 314, and/or communication manager 316) of characteristic identification component 216. Signature determination component 226 may optionally compare those multiple characteristics and exclude one or more received characteristics that are not in concurrence with the majority of received characteristics, may give each received characteristic a corresponding weight (e.g., according to reliability, accuracy, etc.), and/or may combine the characteristics for that state to generate that particular state of the device based on those received characteristics. For example, signature determination component 226 may weight characteristics that are explicitly determined more than characteristics that are inferred. For instance, characteristics determined via communication manager 316 may be weighed more than, for example, characteristics determined via remote signal detector 310.

Action determination component 228 may be implemented as hardware (e.g., electrical circuits), or hardware that executes one or both of software (e.g., as executed by a processor or processing device) and firmware. Action determination component 228 is configured to operate and perform functions according to the embodiments described herein. For example, action determination component 228 may be configured to, based on the determined state signature, perform at least one action with respect to a particular consumer electronic device or its associated device(s). For example, and without limitation, action determination component 228 may issue a toggle command to source device(s) 202 and/or sink device(s) 206 to toggle power (i.e., to turn it off or on), issue an operational command to source device(s) 202 and/or sink device(s) 206, such as "play" or "pause", transmit a notification message to source device(s) 202 and/or sink device(s) 206 and/or a mobile device communicatively coupled thereto or switching device 204, and/or automatically cause switching device 204 to switch to port(s) of ports 210 to which a particular source device of source device(s) 202 and/or a particular sink device of sink device(s) 206 are connected. Action determination component 228 may determine the action(s) to be performed using second mapping component 230.

Second mapping component 230 may be implemented as hardware (e.g., electrical circuits), or hardware that executes one or both of software (e.g., as executed by a processor or processing device) and firmware. Second mapping component 230 is configured to operate and perform functions according to the embodiments described herein. Second mapping component 230 is configured to maintain a state signature-to-action mapping that specifies action(s) that are to be performed by switching device 204 based on the state signature for a particular device. Second mapping component 230 may maintain a state signature-to-action mapping for each of source device(s) 202 and/or sink device(s) 206. Each state signature-to-action mapping may comprise a data structure (e.g., a table) that associates the action(s) to take for any given state signature. Action determination component 228 may reference second mapping component 230 to determine the action(s) to be performed in response to detecting a triggering event.

One example of a triggering event may be determining that a user has performed an action intended to cause any or all of source device(s) 202 and/or sink device(s) 206 to transition to a desired power state. One such action may be providing a command (e.g., via interacting with a particular interface element (e.g., a button or selectable icon) (or the like) of a remote control device or via a voice command) that is configured to power on or off particular source device(s) 202 and/or sink device(s) 206. For instance, a user may interface with a "Watch DVD" interface element on a remote control device or speak the words "Watch DVD" in a microphone included in the remote control device and/or switching device 204. Remote signal detector 310 and/or user input monitor 306 may detect the command and cause action determination component 228 to determine the state signature of all the devices that should be in the power on state responsive to detecting the command (e.g., a DVD player and a TV communicatively coupled to switching device 204 via ports 210). For example, action determination component 228 may retrieve the state signature for each of the DVD player and the TV from storage(s) 222. Once retrieved, action determination component 228 may provide the retrieved state signatures to second mapping component 230, which provides the action(s) to be performed based on the state signature and the detected command. For instance, second mapping component 230 may associate various commands to the state signature-to-action mapping to determine which action should be taken based on the command received and the state signature of a particular device. For example, suppose the command received is a "Watch DVD" command, and the state signature for the DVD player and the TV indicate that the DVD player and the TV are powered-off, the state signature-to-action mapping for each of the DVD player and/or TV may specify that switching device 204 is to send a toggle command to each of DVD player and/or TV that causes the DVD player and TV to power themselves on. If the state signature for the DVD player indicates that the DVD player is turned on and the state signature for the TV indicates that the TV is powered-off, the state signature-to-action mapping for the DVD player may specify that no action is to be taken with respect to the DVD player (since the toggle command would result in the DVD player turning off) and the state signature-to-action mapping for the TV may specify that switching device 204 is to send a toggle command to the TV that causes the TV to power itself on. If the state signature for the DVD player indicates that the DVD player is turned off and the state signature for the TV indicates that the TV is powered on, the state signature-to-action mapping for the DVD player may specify that switching device 204 is to send a toggle command to the DVD player that causes the DVD to power itself on, and the state signature-to-action mapping for the TV player may specify that no action is to be taken with respect to the TV player (since the toggle command would result in the TV turning off). If the state signature for the DVD player indicates that the DVD player is powered on and the state signature for the TV indicates that the TV is powered on, the state signature-to-action mapping for each of the DVD player and the TV may specify that that no toggle commands are to be provided to the TV and the DVD player (since the toggle commands would result in the both the DVD player and the TV turning off). In each of the examples, the state signature-to-action mapping may further specify that switching device 204 is to automatically switch to the port of ports 210 to which the DVD player is coupled. Switching device 204 may utilizes the device-to-port mapping of first mapping component 214 to determine the port to which the DVD player is coupled.

Another action may be providing a command (e.g., via interacting with a particular interface element (e.g., a button or selectable icon) (or the like) of a remote control device or via a voice command) that is configured to change the operational mode of particular source device(s) 202 and/or sink device(s) 206. For instance, a user may interface with a "Play/Pause" interface element on a remote control device. Interaction of the "Play/Pause" interface may toggle between pausing content being played back by a corresponding device and resuming playback of that content. Remote signal detector 310 and/or user input monitor 306 may detect the command and cause action determination component 228 to determine the state signature of the device playing the content (e.g., a satellite TV or cable set-top box) responsive to detecting the command. For example, action determination component 228 may retrieve the state signature for the set-top box from storage(s) 222. Once retrieved, action determination component 228 may provide the retrieved state signature to second mapping component 230, which provides the action(s) to be performed based on the state signature and the detected command. Using the example above, suppose the user interacts with a "Play/Pause" interface element, and the state signature for the set-top box indicates that the set-top box is currently playing back content (i.e., it is not in a paused state), the state signature-to-action mapping for the set-top box may specify that switching device 204 is to send a pause command to the set-top box that causes the set-top box to pause the content. If the state signature for the set-top box indicates that the set-top box is in a pause state (i.e., the content has been paused), the state signature-to-action mapping may specify that switching device 204 is to send a play command to the set-top box that causes the set-top box to resume playback of the content.

Another example of a triggering event may be inferring that a user desires to use one or more of source device(s) 202 and/or sink device(s) 206. For example, upon signature determination component 226 determining that a media streaming device coupled to a port of switching device 204 is in streaming operational mode (i.e., the media streaming device is streaming content), action determination component 228 may provide the state signature specifying the streaming operational mode to second mapping component 230, which provides the action(s) to be performed. For example, the state signature-to-action mapping for the set-top box may specify that switching device 204 is to automatically switch to the port of ports 210 to which the streaming media device is coupled. Switching device 202 may utilize the device-to-port mapping of first mapping component 214 to determine the port to which the streaming media device is coupled.

In another example, signature determination component 226 may determine that a sink device (e.g., one or more speakers) coupled to a port of A/V ports 210 of switching device 204 is in a communication state, where a mobile device is communicating with the sink device, and infer that a user is attempting to stream music to the speaker(s) using the mobile device. Action determination component 228 may provide the state signature specifying the communication state to second mapping component 230, which provides the action(s) to be performed. For example, the state signature-to-action mapping for the speaker(s) may specify that switching device 204 is to automatically switch to the port of ports 210 to which the speaker(s) are coupled. Switching device 202 may utilize the device-to-port mapping of first mapping component 214 to determine the port to which the speaker(s) are coupled.

In yet another example, signature determination component 226 may determine that a mobile device has a particular proximity state (e.g., the mobile device is within a certain proximity within switching device 204, and infer that a user is attempting to perform an action with respect to mobile device and switching device 204 (such as, but no limited to attempting to make a mobile payment using the mobile device to buy or rent a movie). Action determination component 228 may provide the state signature specifying the proximity state to second mapping component 230, which provides the action(s) to be performed. For example, the state signature-to-action mapping for the mobile device may specify that switching device 204 is to automatically transmit a notification to mobile device that specifies whether the user would like to initiate a mobile payment.

It is noted that while the foregoing examples describe that the second mapping component 230 associates action(s) with a single state specified in the state signature the second mapping component 230 may associate action(s) to be performed based on more than one state specified in the state signature.

Figure 4:
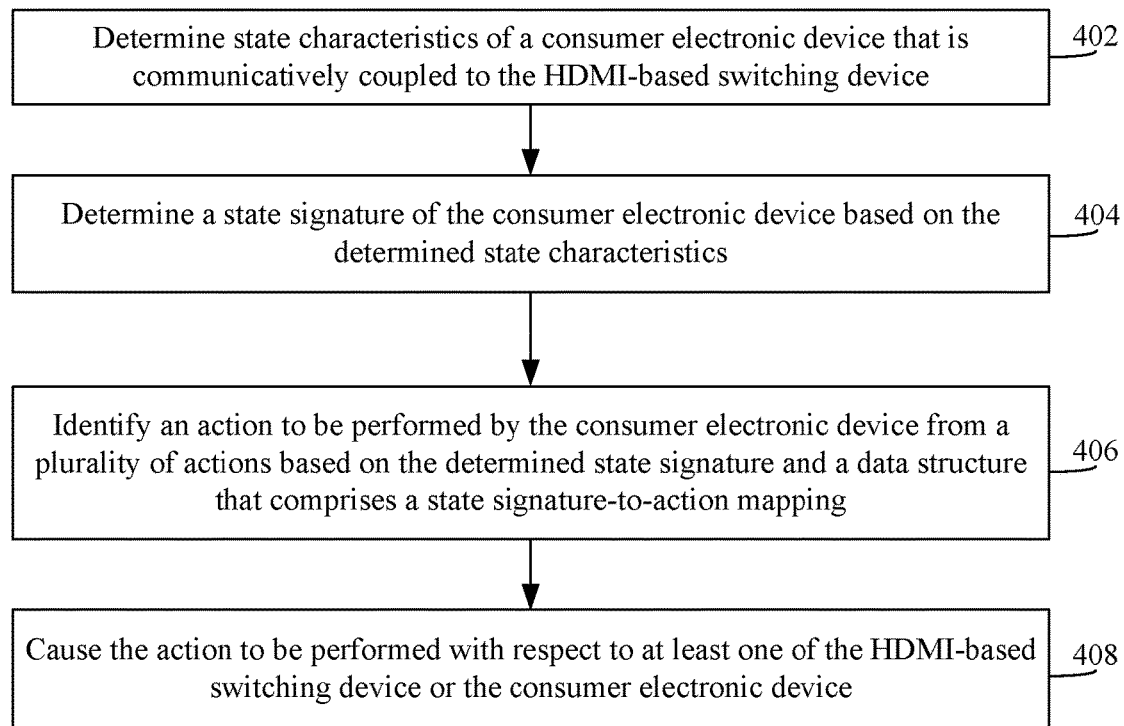
FIG. 4 is a flowchart of a method performed by an HDMI-based switching device that determines a state signature for a consumer electronic device and causes an action to be performed based on the determined state signature, according to an exemplary embodiment.

Accordingly, in embodiments, switching device 204 may determine a state signature for a plurality of source device(s) 202 and/or a sink device(s) 206 and cause an action to be performed based on the determined state signature(s) in many ways. For instance, FIG. 4 depicts a flowchart 400 of a method performed by an HDMI-based switching device that determines a state signature for a consumer electronic device and causes an action to be performed based on the determined state signature in accordance with an embodiment. The switching device may comprise a plurality of HDMI ports. The method of flowchart 400 may be implemented by system 200 as described above in reference to FIG. 2. Other structural and operational embodiments will be apparent to persons skilled in the relevant art(s) based on the following discussion regarding flowchart 400 and system 200.

Flowchart 400 begins with step 402. At step 402, state characteristics of a consumer electronic device that is communicatively coupled to the HDMI-based switching device are determined. For example, with reference to FIG. 2, characteristic identification component 216 is configured to determine state characteristics of a consumer electronic device (e.g., one of source device(s) 202 or sink device(s) 206) that is communicatively coupled to the HDMI-based switching device. Additional details regarding determining state characteristics for the consumer electronic device are described below with reference to FIGS. 5-20.

At step 404, a state signature of the consumer electronic device is determined based on the determined state characteristics. For example, with reference to FIG. 2, signature determination component 226 determines a state signature of the consumer electronic device based on the determined state characteristics.

In accordance with one or more embodiments, the state signature of the consumer electronic device is based on at least one of a power state of the consumer electronic device, a proximity state of the consumer electronic device to another device, a communication state of the consumer electronic device, or an operational state of the consumer electronic device.

At step 406, an action to be performed by the consumer electronic device is identified from a plurality of actions based on the determined state signature and a data structure that comprises a state signature-to-action mapping. For example, with reference to FIG. 2, action determination component 228 identifies an action from a plurality of actions to be performed by the consumer electronic device based on the determined state signature and a data structure maintained by second mapping component 230 that comprises a state signature-to-action mapping.

At step 408, the action is caused to be performed with respect to at least one of the HDMI-based switching device or the consumer electronic device. For example, with reference to FIG. 2, action determination component 228 causes the action to be performed with respect to at least one of switching device 203 or the consumer electronic device.

In accordance with one or more embodiments, the action comprises at least one of transmitting a toggle command to the consumer electronic device to toggle a power state of the consumer electronic device, transmitting an operational command to the consumer electronic device that causes the consumer electronic to perform an operation specified by the operational command, automatically switching to an HDMI port of the plurality of HDMI ports to which the consumer electronic device is coupled, or transmitting a notification message to the consumer electronic device.

Figure 5:
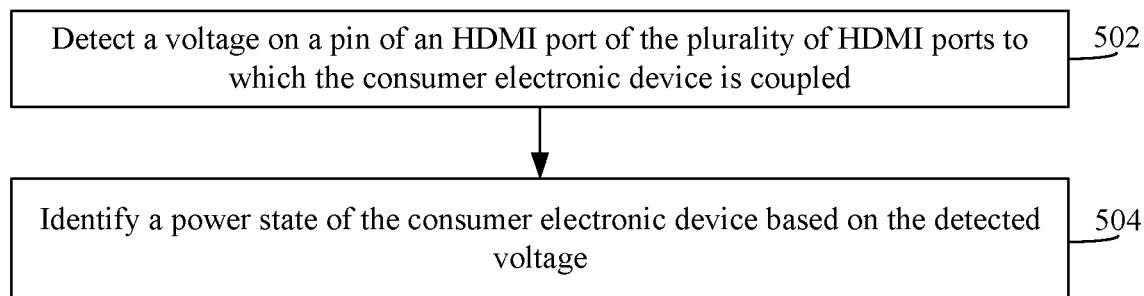
FIG. 5 is a flowchart of a method performed by a signal detector of a switching device that determines state characteristics of a consumer electronic device, according to an exemplary embodiment.
Figure 6:
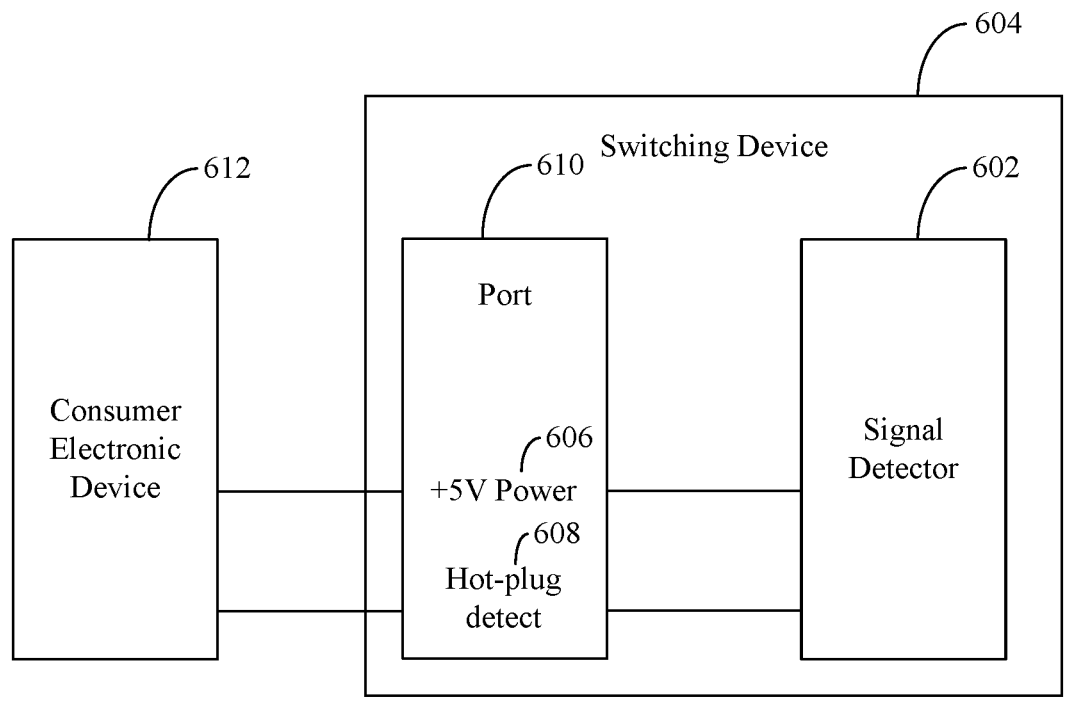
FIG. 6 shows a block diagram of a system comprising a consumer electronic device and a switching device configured to perform control functions based on a determined state of the consumer electronic device, according to an exemplary embodiment.

In accordance with one or more embodiments, signal detector 302 of FIG. 3 is configured to determine state characteristics(s) of a consumer electronic device. For instance, FIG. 5 depicts a flowchart 500 of a method performed by a signal detector of a switching device that determines state characteristics of a consumer electronic device in accordance with an embodiment. In an embodiment, the method of flowchart 500 may be implemented by a signal detector 602, as shown in FIG. 6. FIG. 6 shows a block diagram of a system 600 comprising a switching device 604 and a consumer electronic device 612, according to an example embodiment. Switching device 604 comprises an HDMI port 610 and signal detector 602. Signal detector 602 is an example of signal detector 302, as shown in FIG. 4. HDMI port 610 is an example of ports 210 and consumer electronic device 612 is an example of one of source device(s) 202 or sink device(s) 206, as respectively shown in FIG. 2. As further shown in FIG. 6, HDMI port 610 may comprise a +5V power pin 606 and a hot plug detect (HPD) pin 606. It is noted that HDMI port 610 may comprise one or more other pins that are not shown for brevity. Other structural and operational embodiments will be apparent to persons skilled in the relevant art(s) based on the following discussion regarding flowchart 500 and system 600.

Flowchart 500 begins with step 502. At step 502, a voltage on a pin of an HDMI port of the plurality of HDMI ports to which the consumer electronic device is coupled is detected. For example, with reference to FIG. 6, signal detector 602 detects a voltage on a one of +5V power pin 606 or HPD pin 608. In particular, signal detector 602 may detect whether 5 volts has been provided on one of +5V power pin 606 or HPD pin 608.

At step 504, a power state of the consumer electronic device is identified based on the detected voltage. For example, with reference to FIG. 6, signal detector 602 may identify a power state of the consumer electronic device based on the detected voltage. For instance, if consumer electronic device 612 is a source device, consumer electronic device 612 provides 5 volts on +5V power pin 606 when it is in a power on state, 0 volts when it is in a power off state, and/or a voltage between 0 and 5 volts when it is in a standby state. If consumer electronic device 612 is a sink device, consumer electronic device 612 provides 5 volts on HPD pin 608 when it is in a power on state, 0 volts when it is in a power off state, and/or a voltage between 0 and 5 volts when it is in a standby state. Accordingly, signal detector 602 may determine the power state of consumer electronic device 612 based on the amount of voltage provided on +5V Power pin 606 or HPD pin 608 (depending on whether consumer electronic device 612 is a source device or a sink device).

Figure 7:
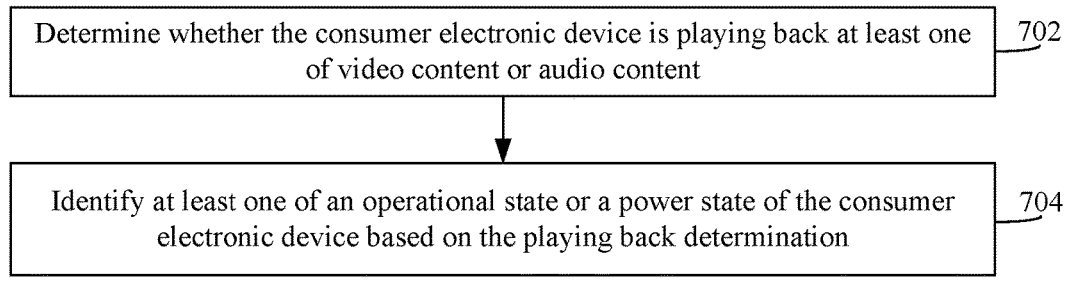
FIG. 7 depicts a flowchart of a method performed by an audio/video detector of a switching device that determines state characteristic(s) of a consumer electronic device, according to an exemplary embodiment.
Figure 8:
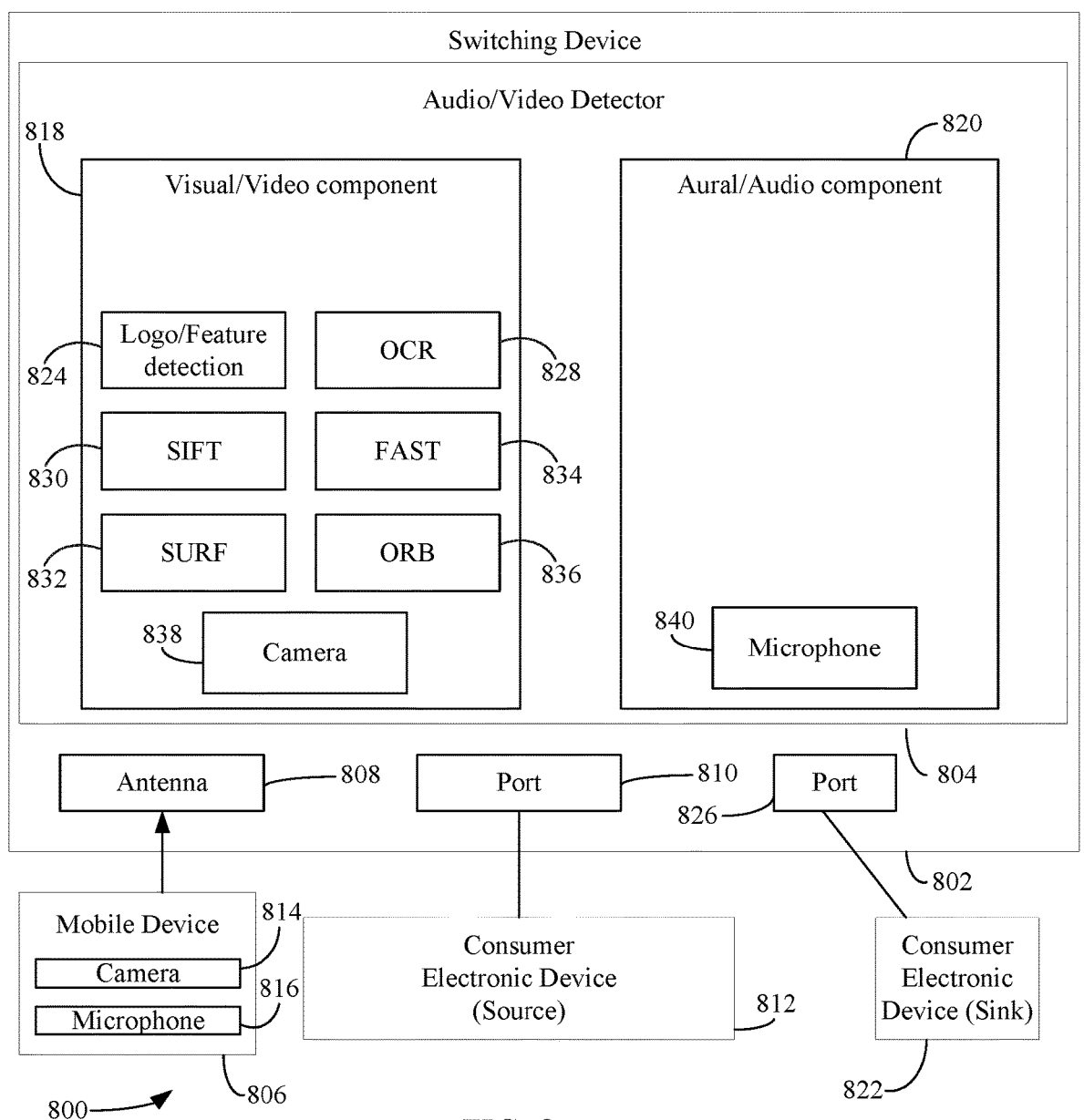
FIG. 8 is a block diagram of a system comprising a source consumer electronic device, a sink consumer electronic device, a mobile device, and a switching device configured to perform control functions based on determined states, according to an exemplary embodiment.

In accordance with one or more embodiments, audio/video detector 304 of FIG. 3 is configured to determine state characteristic(s) of a consumer electronic device. For instance, FIG. 7 depicts a flowchart 700 of a method performed by an audio/video detector of a switching device that determines state characteristic(s) of a consumer electronic device in accordance with an embodiment. In an embodiment, the method of flowchart 700 may be implemented by an audio/video detector 804 included in a switching device 802, as shown in FIG. 8. FIG. 8 shows a block diagram of a system 800 comprising switching device 802, a source consumer electronic device 812, a sink consumer electronic device 822 and a mobile device 806, according to an example embodiment. Switching device 802 is an example of switching device 204, source consumer electronic device 812 is an example of one of source device(s) 202, and sink consumer electronic device 822 is an example of one or sink device(s) 206, as described above with reference to FIG. 2. Switching device 802 comprises audio/video detector 804, an HDMI port 810, an HDMI port 826, and an antenna 808. Audio/video detector 804 is an example of audio/video detector 304, as shown in FIG. 3, and HDMI ports 810 and 826 are each an example of one of ports 210, as shown in FIG. 2. Consumer electronic device 812 is coupled to HDMI port 810, and consumer electronic device 822 is coupled to HDMI port 826. As further shown in FIG. 8, mobile device 806 comprises a camera 814 and a microphone 816. In the embodiment shown in FIG. 8, the user is using consumer electronic devices 812 and 822, and therefore HDMI ports 810 and 826 are active (i.e., video and/or audio signals are being transmitted from consumer electronic device 812 to consumer electronic device 822 for playback thereby via HDMI ports 810 and 826. Other structural and operational embodiments will be apparent to persons skilled in the relevant art(s) based on the following discussion regarding flowchart 700 and system 800.

Flowchart 700 begins with step 702. At step 702, a determination is made whether the consumer electronic device is playing back at least one of video content or audio content. For example, with reference to FIG. 8, audio/video detector 804 comprises a visual/video component 818 and an aural/audio component 820. Visual/video component 818 and aural/audio component 820 may be configured to determine that consumer electronic device 812 is playing back video and/or audio content. In accordance with an embodiment, visual/video component 818 may be configured to analyze the video signals that are being received from consumer electronic device 812 via port 810 and/or provided to consumer electronic device 822 via HDMI port 826. If visual/video component 818 detects video signals, then visual/video component 818 may determine that consumer electronic device 812 is playing back video content. Aural/audio component 820 may be configured to analyze the audio signals that are being received from consumer electronic device 812 via port 810 and/or provided to consumer electronic device 822 via HDMI port 826. If aural/audio component 820 detects audio signals, then aural/audio component 820 may determine that consumer electronic device 812 is playing back audio content.

In accordance with another embodiment, visual/video component 818 comprises a camera 838, which is configured to capture one or more images of the video content being played back by consumer electronic device 822, and aural/audio component 820 comprises a microphone 840, which is configured to capture (e.g., record) audio content being played back consumer electronic device 822. Upon capturing the video content and/or audio content, visual/video component 818 and/or aural/audio component 820 may determine that consumer electronic device 812 is providing audio/video signals to consumer electronic device 822 and/or consumer electronic device 822 is playing back video and/or audio content.

In accordance with yet another embodiment, the video content and/or audio content being played back by consumer electronic device 822 are captured by a camera 814 and/or microphone 816 included in a mobile device 814. For example, the user may hold mobile device 814 such that camera 814 and/or microphone 816 is facing a display and/or speakers included in consumer electronic device 822. The captured video and/or audio content may be provided to switching device 802 via a wired or wireless connection (e.g. Bluetooth™ ZigBee®, NFC, IEEE 802.11-based protocols, etc.). For example, antenna 808 may wirelessly receive the captured video and/or audio content in accordance with the aforementioned wireless protocols. Upon receiving the video content and/or audio content, visual/video component 818 and/or aural/audio component 820 may determine that consumer electronic device 812 is providing audio/video signals to consumer electronic device 822 and/or consumer electronic device 822 is playing back video and/or audio content. Examples of mobile device 806 include, but are not limited to, a telephone (e.g., a smart phone and/or a mobile phone), a computer (e.g., a tablet, a laptop, netbook, and/or the like), a remote control device that includes camera 814 and microphone 816, etc.

At step 804, at least one of an operational state or a power state of the consumer electronic device is identified based on the playing back determination. For example, with reference to FIG. 8, visual/video component 818 and/or aural/audio component 820 may determine (e.g., infer) that consumer electronic device 812 and/or consumer electronic device 822 are in a power on state in response to determining that consumer electronic device 812 is providing audio/video signals to consumer electronic device 822 and/or consumer electronic device 822 is playing back video and/or audio content. In contrast, visual/video component 818 and/or aural/audio component 820 may determine (e.g., infer) that consumer electronic device 812 and/or consumer electronic device 822 are in a power off state in response to determining that consumer electronic device 812 is not providing audio/video signals to consumer electronic device 822 and/or consumer electronic device 822 is not playing back video and/or audio content.

Visual/video component 818 may be further configured to determine whether consumer electronic device 812 is in a particular operational state (e.g., whether consumer electronic device has paused content, is playing back content, is rewinding content, is fast-forwarding content, is displaying a particular GUI screen, such as a home screen, etc.) by performing an analysis on the detected and/or captured video content. For instance, as shown in FIG. 8, visual/video component 818 may include a plurality of sub-components, including a logo/feature detection component 824, an OCR (optical character recognition) component 828, a SIFT (scale-invariant feature transform) component 830, a SURF (speeded-up robust features) component 832, a FAST (features from accelerated segment test) component 834, and an ORB (oriented FAST rotated binary robust independent elementary features (BRIEF)) component 836. Each of these sub-components is configured to capture or determine video aspects and characteristics to determine the operational state of consumer electronic device 812, according to embodiments.

Such components may be used to recognize certain logos, features and/or text that are being displayed via consumer electronic device 822. Some known techniques for logo/feature detection are a scale-invariant feature transform (SIFT) process, a speeded-up robust features (SURF) process features from accelerated segment test (FAST) process, and an oriented FAST rotated binary robust independent elementary features (BRIEF) (ORB) process.

SIFT and SURF are known proprietary techniques, and ORB is an open source technique and a suitable substitute for SIFT and SURF. ORB is a combination of FAST and BRIEF. FAST is used for feature detection, and BRIEF is used for feature matching. When using ORB, keypoints and descriptors are extracted from the logo that is to be searched. These descriptors are matched with each frame of the video and a FLANN (Fast Library for Approximate Nearest Neighbors) based matcher is used to find the best matches. SIFT component 830 is configured to perform a SIFT process, SURF component 832 is configured to perform a SURF process, FAST component 834 is configured to perform a FAST process, and ORB component 836 is configured to perform an ORB process. The logos/features detected may be indicative of a particular operational state. For example, if a double right arrow feature is detected, visual/video component 818 may determine that consumer electronic device 812 is fast-forwarding content. If a double left arrow is detected, visual/video component 818 determine that consumer electronic device 812 is rewinding content, etc.

In addition to capturing logos and features, visual/video component 818 may further be configured to detect text or blocks of text. OCR component 828 may be configured to perform an OCR process on the captured video content to determine whether text or blocks of text are being displayed. Such text may be indicative of a particular operational state.

Aural/audio component 820 may also be further configured to determine whether consumer electronic device 812 is in a particular operational state by performing an analysis on the detected and/or captured audio content. For instance, aural/audio component 820 may perform compare detected sounds with a database of sounds that each are indicative of a particular operational state. For example, a first sound may indicate that consumer electronic device 812 is causing a home screen to be rendered (e.g., on consumer electronic device 822), while a second sound may indicate that consumer electronic device 812 is fast-forwarding. The foregoing may be accomplished using Mel Frequency Cepstral Coefficients (MFCC), timbre recognition, and/or spectral flatness measure-based techniques.

It is noted that techniques described above for logo/feature/text/sound recognition are purely exemplary and that other techniques may be used. Additional details regarding these techniques may be found in aforementioned U.S. patent application Ser. No. 14/945,125, entitled "Automatic Identification and Mapping of Consumer Electronic Devices to Ports on an HDMI Switch."

Figure 9:
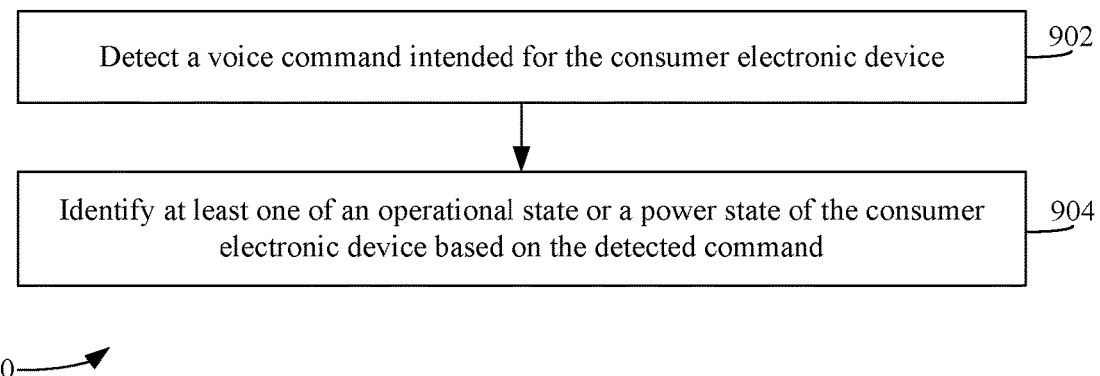
FIG. 9 is a flowchart of a method performed by a user input monitor of a switching device that determines state signature(s) for a consumer electronic device, according to an exemplary embodiment.
Figure 10:
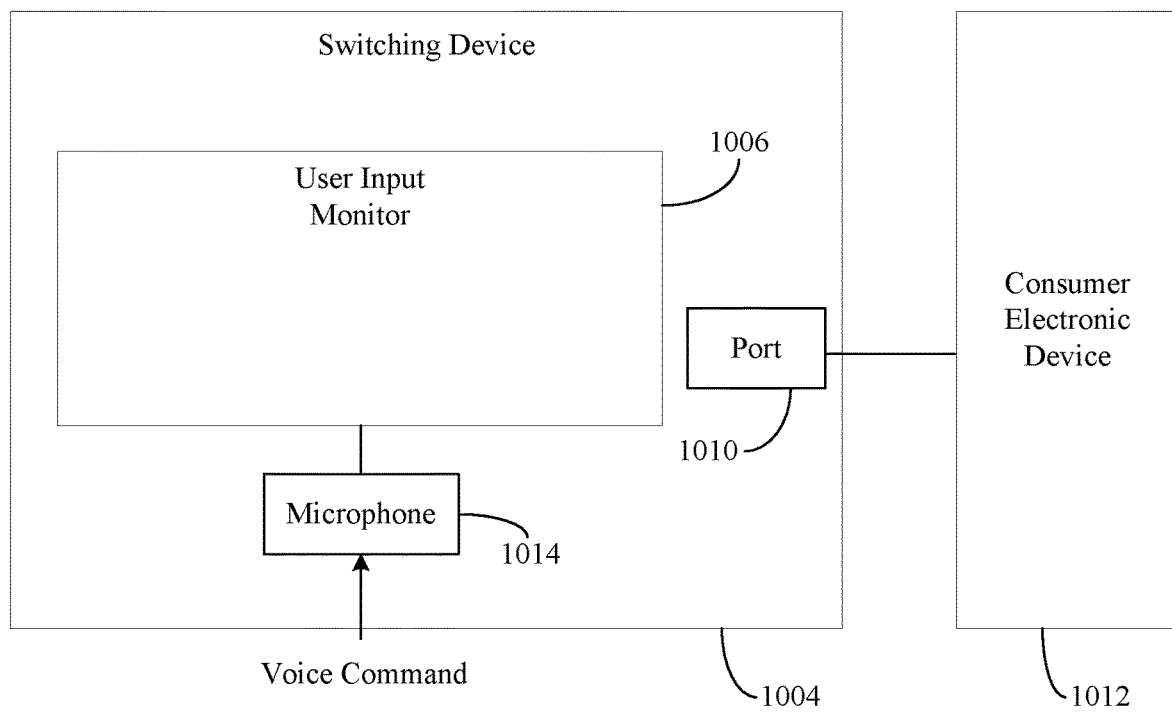
FIG. 10 is a block diagram of a system comprising a consumer electronic device and a switching device configured to perform control functions based on determined states, according to an exemplary embodiment.

In accordance with one or more embodiments, user input monitor 306 of FIG. 3 is configured to determine state characteristic(s) of a consumer electronic device. For instance, FIG. 9 depicts a flowchart 900 of a method performed by a user input monitor of a switching device that determines state signature(s) for a consumer electronic device in accordance with an embodiment. In an embodiment, the method of flowchart 900 may be implemented by a user input monitor 1006 included in a switching device 1004, as shown in FIG. 10. FIG. 10 shows a block diagram of a system 1000 comprising switching device 1004 and a consumer electronic device 1012, according to an example embodiment. Switching device 1004 is an example of switching device 204, and consumer electronic device 812 is an example of one of source device(s) 202 or sink device(s) 206, as described above with reference to FIG. 2. Switching device 1004 comprises user input monitor 1006, an HDMI port 1010, and a microphone 1014. User input monitor 1006 is an example of user input monitor 306, as shown in FIG. 3, and HDMI port 1010 is an example of one of ports 210, as shown in FIG. 2. Consumer electronic device 1012 is coupled to HDMI port 1010. Other structural and operational embodiments will be apparent to persons skilled in the relevant art(s) based on the following discussion regarding flowchart 900 and system 1000.

Flowchart 900 begins with step 902. At step 902, a voice command intended for the consumer electronic device is detected. For example, with reference to FIG. 10, microphone 1014 may capture audio signals and provide the audio signals to user input monitor 1006. User input monitor 1006 analyzes the audio signals to detect voice commands included therein. Alternatively, a microphone included in a mobile device (e.g., mobile device 806, as shown in FIG. 8) may capture audio signals, which are sent to user input monitor 1006 via a wired or wireless connection.

At step 904, at least one of an operational state or a power state of the consumer electronic device is identified based on the detected voice command. For example, with reference, user input monitor 1006 may analyze the voice command and determine (e.g., infer) at least one of an operational state or a power state of consumer electronic device 1012. For example, in an embodiment where consumer electronic device 1012 is a TV, if the voice command is "Turn off TV", user input monitor 1006 may infer that consumer electronic device 1012 will be in a power-off state and specify the power state characteristic to indicate that the TV is in a power off state. Similarly, if the voice command is "Turn on TV", user input monitor 1006 may infer that consumer electronic device 1012 will be in a power-on state and specify the power state characteristic to indicate that the TV is in a power-on state. In an embodiment in which consumer electronic device 1012 is a media streaming device (e.g., a Chromecast), if the voice command is "Play Breaking Bad using Chromecast", user input monitor 1006 may infer that consumer electronic device 1012 will be streaming content and specify the operational characteristic to indicate that the Chromecast is in a streaming state.

Figure 11:
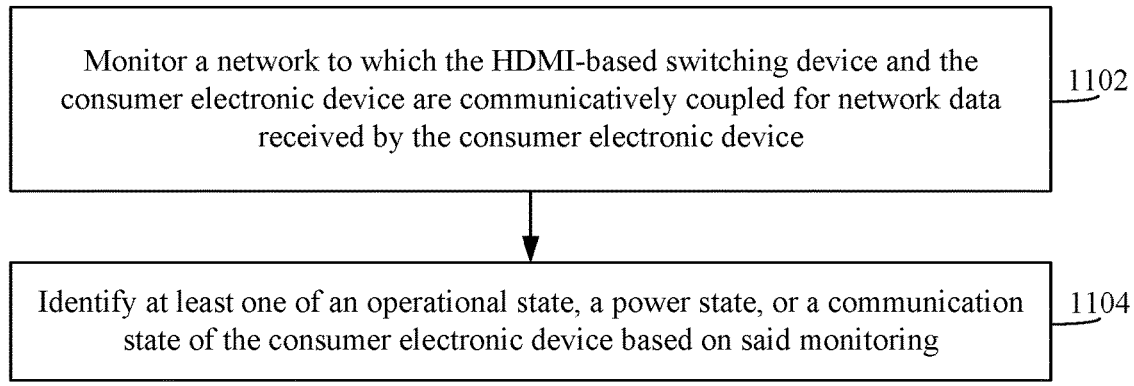
FIG. 11 is a flowchart of a method performed by a network monitor of a switching device that determines state characteristic(s) for a consumer electronic device, according to an exemplary embodiment.
Figure 12:
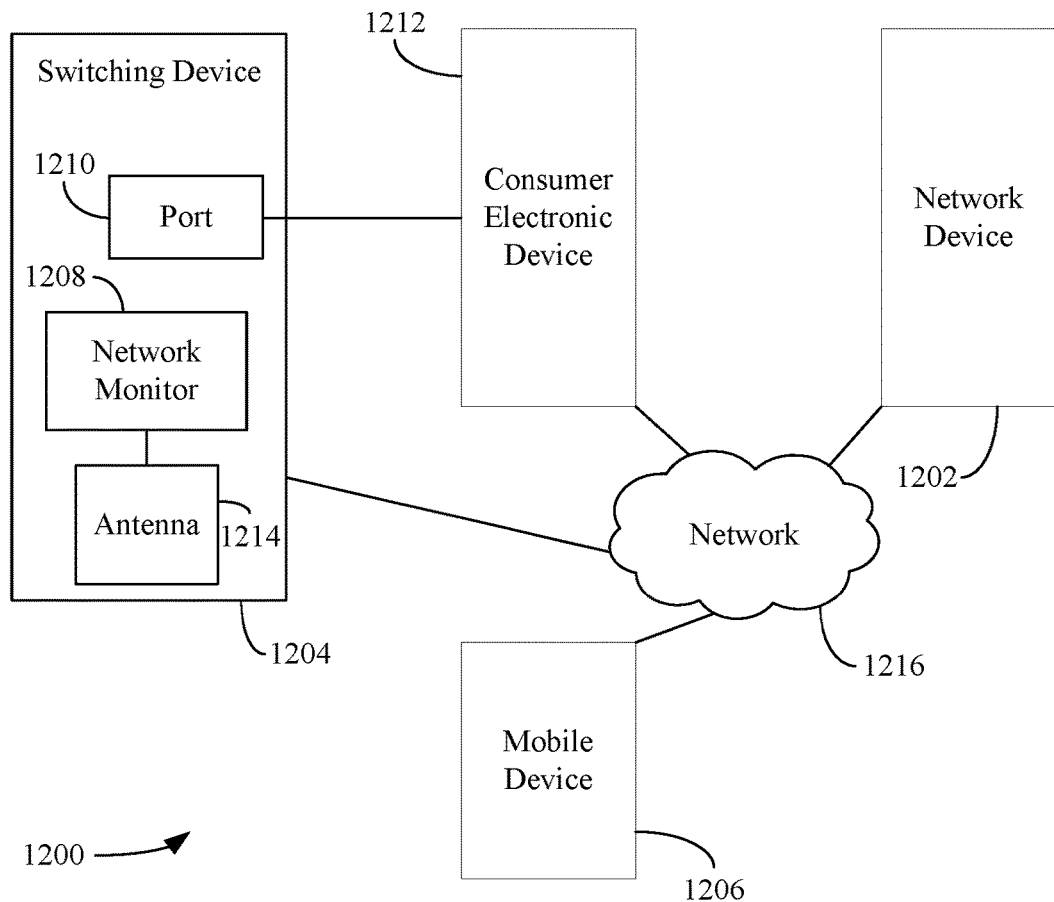
FIG. 12 is a block diagram of a system comprising a consumer electronic device, a mobile device, a network device, and a switching device configured to perform control functions based on determined states, according to an exemplary embodiment.

In accordance with one or more embodiments, network monitor 308 of FIG. 3 is configured to determine a state characteristic of a consumer electronic device. For instance, FIG. 11 depicts a flowchart 1100 of a method performed by a network monitor of a switching device that determines state characteristic(s) for a consumer electronic device in accordance with an embodiment. In an embodiment, the method of flowchart 1100 may be implemented by a network monitor 1208 included in a switching device 1204, as shown in FIG. 12. FIG. 12 shows a block diagram of a system 1200 comprising switching device 1204, a consumer electronic device 1212, a mobile device 1206, and a network device 1202, according to an example embodiment. Switching device 1204 is an example of switching device 204, and consumer electronic device 1212 is an example of one of source device(s) 202 or sink device(s) 206, as described above with reference to FIG. 2. Mobile device 1206 is an example of mobile device 806, as described above with reference to FIG. 8. Switching device 1204 comprises network monitor 1208, an HDMI port 1210, and an antenna 1214. Network monitor 1208 is an example of network monitor 308, as shown in FIG. 3, and HDMI port 1210 is an example of one of ports 210, as shown in FIG. 2. Antenna 1214 is an example of antenna 808, as described above with reference to FIG. 8. Consumer electronic device 1212 is coupled to HDMI port 1210. Switching device 1204, consumer electronic device 1212, network device 1202 and/or mobile device 1206 are communicatively coupled via a network 1216. Other structural and operational embodiments will be apparent to persons skilled in the relevant art(s) based on the following discussion regarding flowchart 1100 and system 1200.

Flowchart 1100 begins with step 1102. At step 1102, a network to which the HDMI-based switching device and the consumer electronic device are communicatively coupled is monitored for network data received by the consumer electronic device. For example, with reference to FIG. 12, network monitor 1208 may be configured to monitor network 1216 for network data received by consumer electronic device 1212 by network device 1202. For instance, network 1216 may be a wireless network (e.g., a Wi-Fi network, a Bluetooth network, a Zigbee® network, etc.) to which switching device 1204 and consumer electronic device 1212 are coupled. Network 1216 may be provided by network device 1202. Network monitor 1208 may be configured to detect (e.g., sniff) data packets being provided to consumer electronic device 1212 from network device 1202. For example, network monitor 1208 may maintain a listing of device identifier(s) for devices (e.g., consumer electronic device 1212 or mobile device 1206) connected to network 1216 that are included in a header of data packets that are transmitted to and/or from such devices. The device identifier(s) may be obtained by querying consumer electronic device 1212, mobile device 1206, and/or network device 1202 for the device identifier(s). When network device 1202 detects a data packet transmitted to consumer electronic device 1212 having an identifier corresponding to consumer electronic device 1214, network monitor 1208 may determine that consumer electronic device 1212 is receiving network data. Examples of network device 1202 include, but are not limited to, a router, a wireless access point, etc.

At step 1104, at least one of an operational state, a power state, or a communication state of the consumer electronic device is identified based on the monitoring of step 1102. For example, with reference to FIG. 12, network monitor 1208 may determine at least one of an operational state, a power state, or a communication state of consumer electronic device 1212. For example, network monitor 1208 may determine (e.g., infer) that consumer electronic device 1212 is in a power-on state in response to a determination that consumer electronic device 1212 is transmitting and/or receiving network data. Conversely, network monitor 1208 may determine (e.g., infer) that consumer electronic device 1212 is in a power-off state in response to a determination that consumer electronic device 1212 is not transmitting and/or receiving network data.

Network monitor 1208 may also monitor the amount of data being received by consumer electronic device 1212 and determine whether the operational state of consumer electronic device 1212 is a streaming operational state. For example, network monitor 1208 may compare the amount of data being received to a threshold and determine that the consumer electronic device 1212 is streaming video and/or audio content if the amount of data exceeds the threshold.

Network monitor 1208 may also monitor network data between other devices (e.g., other consumer electronic devices and/or mobile devices) to determine whether such devices are in communication and infer a particular communicative state between such devices. For example, network monitor 1208 may determine that mobile device 1206 is attempting to communicate with a device configured to stream content (e.g., a media streaming device, such as, but not limited to, Chromecast®, AppleTV®, Amazon FireTV®). Consequently, network monitor 308 may determine that mobile phone 1206 and the media streaming device are two devices attempting to connect to each other to establish an audio/video streaming session. In another example, network monitor 1207 may determine that mobile phone 1206 and a sink device coupled to switching device 1204 (e.g., a Sonos® speaker system), are two devices attempting to connect to each other establish an audio streaming session.

Figure 13:
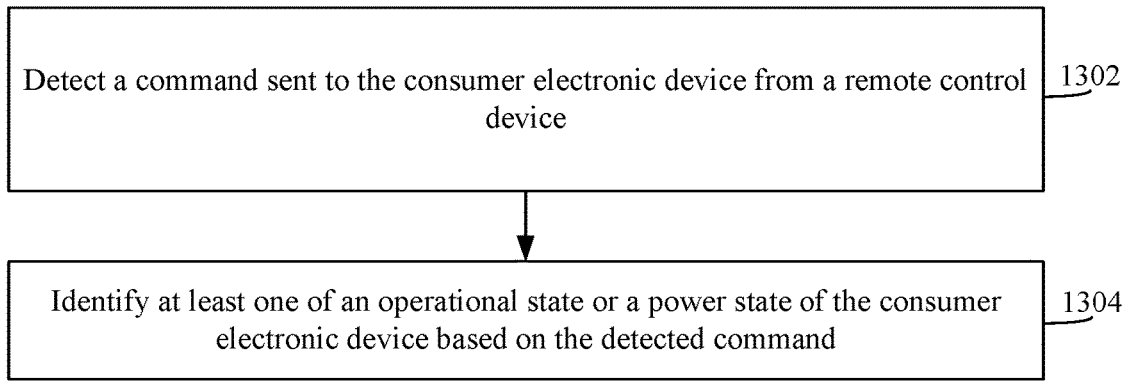
FIG. 13 is a flowchart of a method performed by a remote signal detector of a switching device that determines state characteristic(s) for a consumer electronic device, according to an exemplary embodiment.
Figure 14:
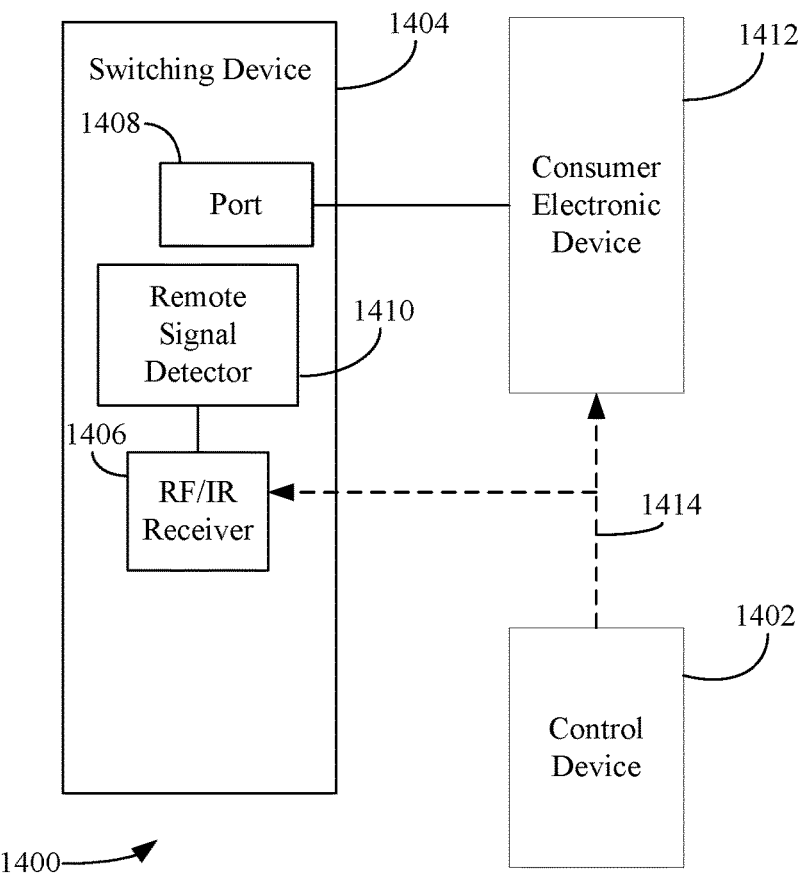
FIG. 14 is a block diagram of a system comprising a consumer electronic device, a control device, and a switching device configured to perform control functions based on determined states, according to an exemplary embodiment.

In accordance with one or more embodiments, remote signal detector 310 of FIG. 3 is configured to determine state characteristic(s) of a consumer electronic device. For instance, FIG. 13 depicts a flowchart 1300 of a method performed by a remote signal detector of a switching device that determines state characteristic(s) for a consumer electronic device in accordance with an embodiment. In an embodiment, the method of flowchart 1300 may be implemented by a remote signal detector 1410 included in a switching device 1404, as shown in FIG. 14. FIG. 14 shows a block diagram of a system 1400 comprising switching device 1404, a consumer electronic device 1412, and a control device 1402, according to an example embodiment. Switching device 1404 is an example of switching device 204, and consumer electronic device 1412 is an example of one of source device(s) 202 or sink device(s) 206, as described above with reference to FIG. 2. Switching device 1404 comprises remote signal detector 1410, an HDMI port 1408, and an RF/IR receiver 1406. Remote signal detector 1410 is an example of remote signal detector 310, as shown in FIG. 3, and HDMI port 1408 is an example of one of ports 210, as shown in FIG. 2. Consumer electronic device 1412 is coupled to HDMI port 1408. Other structural and operational embodiments will be apparent to persons skilled in the relevant art(s) based on the following discussion regarding flowchart 1300 and system 1400.

Flowchart 1300 begins with step 1302. At step 1302, a command sent to the consumer electronic device from a remote control device is detected. For example, with reference to FIG. 14, remote signal detector 1410 may be configured to detect (e.g., "sniff") control signals 1404 transmitted by control device 1402 that are intended for consumer electronic device 1412. For example, RF/IR receiver 1406 may be configured to receive control signal(s) 1414 that are transmitted via an IR or RF-based protocol. Upon detecting control signals(s) 1414, remote signal detector 1410 analyzes control signal(s) 1414 to identify one or more identifier(s) in control signal(s) 1414 that uniquely identify the consumer electronic device for which control signals(s) 1414 are intended (e.g., consumer electronic device 1412). Control signal detector 716 may further determine a command (e.g., play, fast-forward, pause, rewind, etc.) included in control signal(s) 1414.

At step 1304, at least one of an operational state or a power state of the consumer electronic device is identified based on the detected command. For example, with reference to FIG. 14, remote signal detector 1410 may determine at least one of an operational state or a power state of the consumer electronic device is identified based on the detected command. For example, if the command corresponds to a "power on" command, or an operational command (e.g., a rewind command, a fast-forward command, a pause command, etc.), remote signal detector 1410 may determine that the power state of consumer electronic device is a power-on state. Remote signal detector 1410 may also determine the operational state of consumer electronic device 1412 based on the operational command included in the command. Conversely, if the command corresponds to a "power off" command, remote signal detector 1410 may determine that the power state of consumer electronic device is a power-off state.

It is noted that control device 1402 may be operable to control any number of consumer electronic devices (e.g., consumer electronic device 1412) and/or switching device 1404. Control device 1402 may include a display screen and/or one or more physical interface elements (e.g., buttons, sliders, jog shuttles, etc.). In accordance with an embodiment, the display screen (or a portion thereof) may be a capacitive touch display screen. The display screen may be configured to display one or more virtual interface elements (e.g., icons, buttons, search boxes, etc.). The display screen may be configured to enable a user to interact, view, search, and/or select content for viewing via a consumer electronic device and/or switching device 1404. Examples of control device 1402 include a mobile device, such as a telephone (e.g., a smart phone and/or mobile phone), a personal data assistance (PDA), a tablet, a laptop, a remote control device, etc.

It is further noted that while the embodiments described above disclose that control signal(s) 1414 may be transmitted via an RF or IR protocol, in certain embodiments, control signal(s) 1414 may be transmitted via other wireless protocols (E.g., Bluetooth, ZigBee or other RF-based or IP-based protocols) or a wired connection (e.g., via a Universal Serial Bus (USB) cable, a coaxial cable, etc.).

Figure 15:
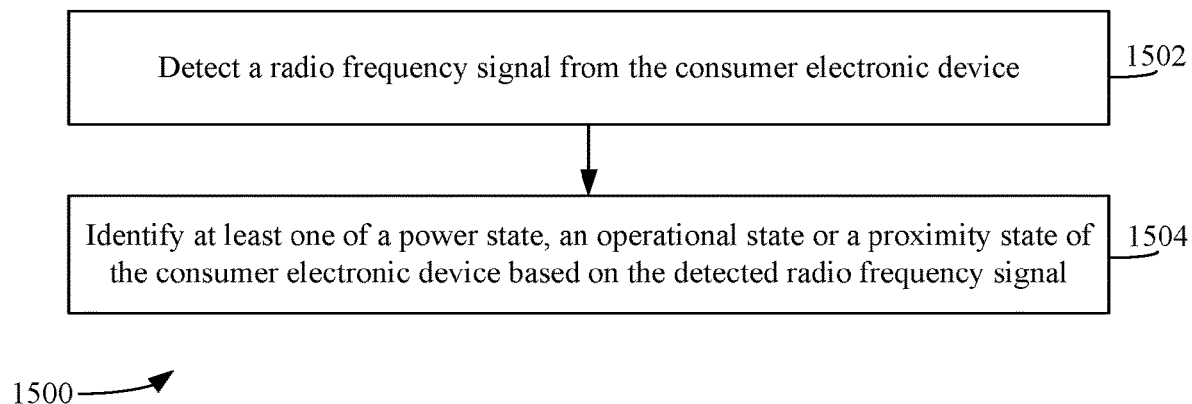
FIG. 15 is a flowchart of a method performed by a proximity detector of a switching device that determines state characteristic(s) for a consumer electronic device, according to an exemplary embodiment.
Figure 16:
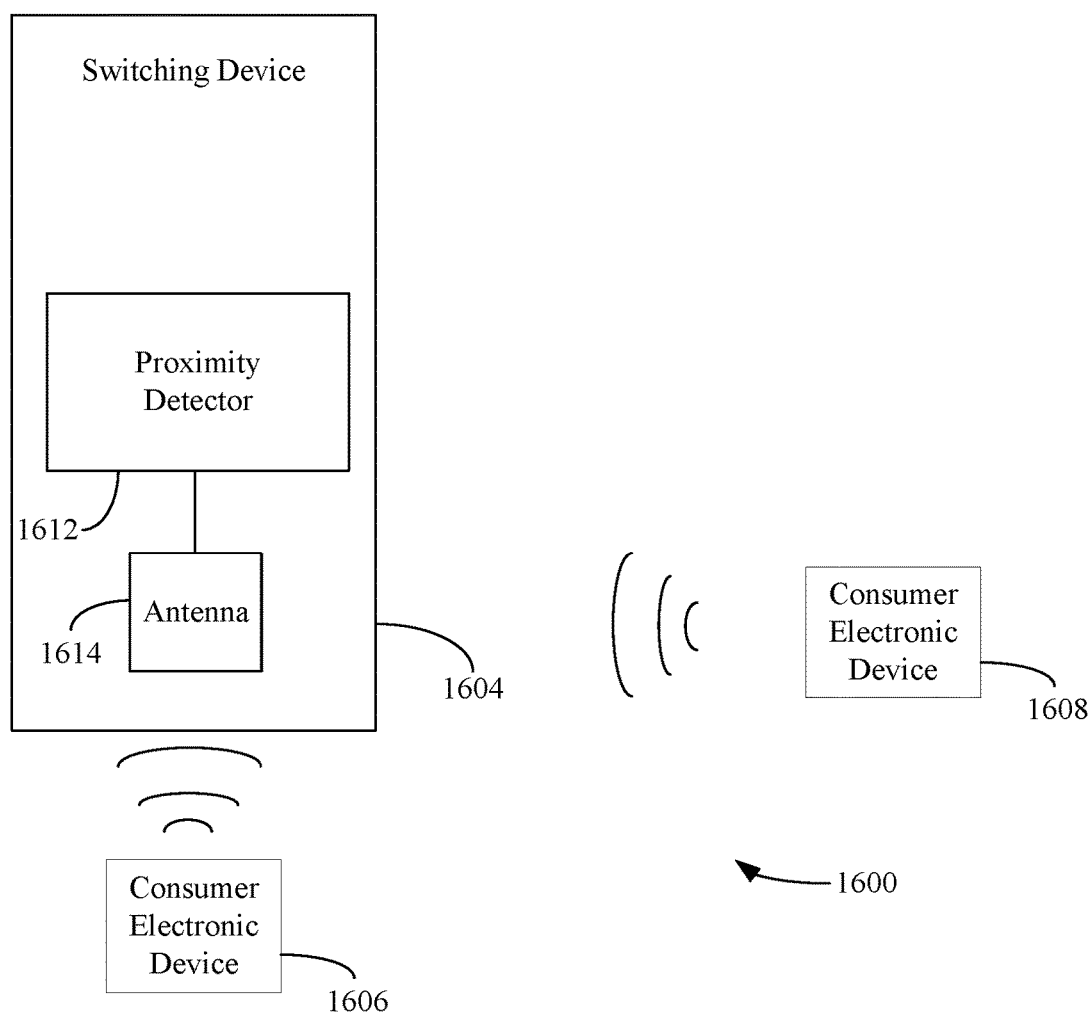
FIG. 16 is a block diagram of a system comprising a consumer electronic device, a consumer electronic device, and a switching device configured to perform control functions based on determined states, according to an exemplary embodiment.

In accordance with one or more embodiments, proximity detector 312 of FIG. 3 is configured to determine state characteristic(s) of a consumer electronic device. For instance, FIG. 15 depicts a flowchart 1500 of a method performed by a proximity detector of a switching device that determines state characteristic(s) for a consumer electronic device in accordance with an embodiment. In an embodiment, the method of flowchart 1500 may be implemented by a proximity detector 1612 included in a switching device 1604, as shown in FIG. 16. FIG. 16 shows a block diagram of a system 1600 comprising switching device 1604, a consumer electronic device 1606, and a consumer electronic device 1608, according to an example embodiment. Switching device 1604 is an example of switching device 204. Switching device 1604 comprises proximity detector 1612 and an antenna 1614. Proximity detector 1612 is an example of proximity detector 312, as shown in FIG. 3. Other structural and operational embodiments will be apparent to persons skilled in the relevant art(s) based on the following discussion regarding flowchart 1500 and system 1600.

Flowchart 1500 begins with step 1502. At step 1502, a radio frequency signal from a consumer electronic device is detected. For example, antenna 1614 may detect a radio frequency signal from consumer electronic device 1606 and/or consumer electronic device 1608. Consumer electronic device 1606 and/or consumer electronic device 1608 may be mobile devices configured to transmit and/or receive RF signals in accordance with any wireless protocol, including, but not limited to, Bluetooth® low energy (BLE), near field communication (NFC) or other RF-based protocols, and antenna 1614 may be configured to transmit and/or receive RF signals in accordance with any of the aforementioned wireless protocols. Examples of consumer electronic devices 1606 and 1608 include, but are not limited to, a mobile device, such as a telephone (e.g., a smart phone and/or mobile phone), a personal data assistance (PDA), a tablet, a laptop, etc.

At step 1504, at least one of a power state, an operational state or a proximity state of the consumer electronic device is identified based on the detected radio frequency signal. For example, with reference to FIG. 16, proximity detector 1612 may determine at least one of a power state, an operational state, or a power state of consumer electronic device 1606 or consumer electronic device 1608 based on the RF signal(s) provided thereby. For example, upon receiving an RF signal, proximity detector 1612 may determine (e.g., infer) that the consumer electronic device providing the RF signal is in a power on state. Proximity detector 612 may also determine the operational state of the consumer electronic device providing the RF signal based on an operational command that may be included in the RF signal. Proximity detector 1612 may also be configured to determine a proximity of consumer electronic device 1606 and/or consumer electronic device 1608 relative to switching device 1602. This characteristic may indicate a proximity state. For example, proximity detector 1612 may detect and/or monitor RF wireless signals transmitted from consumer electronic device 1606 and/or consumer electronic device 1608 for information such as power received and/or signal strength to determine the distance between consumer electronic device 1606 and switching device 1604 and between consumer electronic device 1608 and switching device 1604. In the example shown in FIG. 16, switching device 1604 may determine that consumer electronic device 1606 is closer in proximity to switching device 1604 than consumer electronic device 1608 due to the signal strength being stronger for consumer electronic device 1606. Proximity detector 312 may continuously monitor the power received and/or signal strength to generate and/or update a distance profile for each of consumer electronic device 1606 and/or consumer electronic device 1608. Each distance profile may specify the present distance between a particular consumer electronic device and switching device 1604. The distance profile for a particular consumer electronic device may be an example of a proximity state characteristic.

Figure 17:
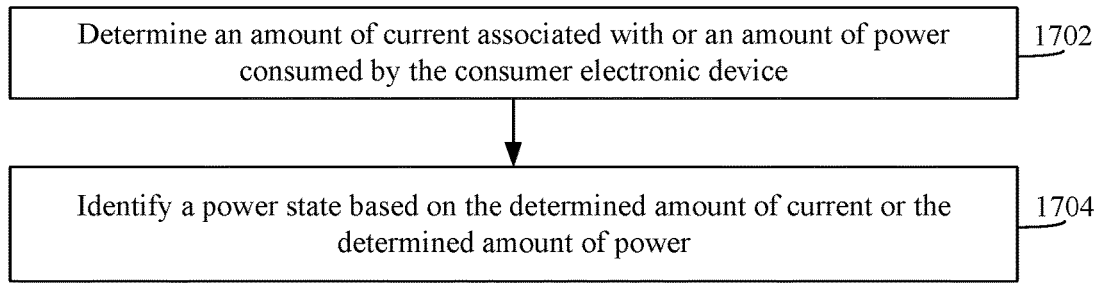
FIG. 17 is a flowchart of a method performed by a power detector of a switching device that determines state characteristic(s) for a consumer electronic device, according to an exemplary embodiment.
Figure 18:
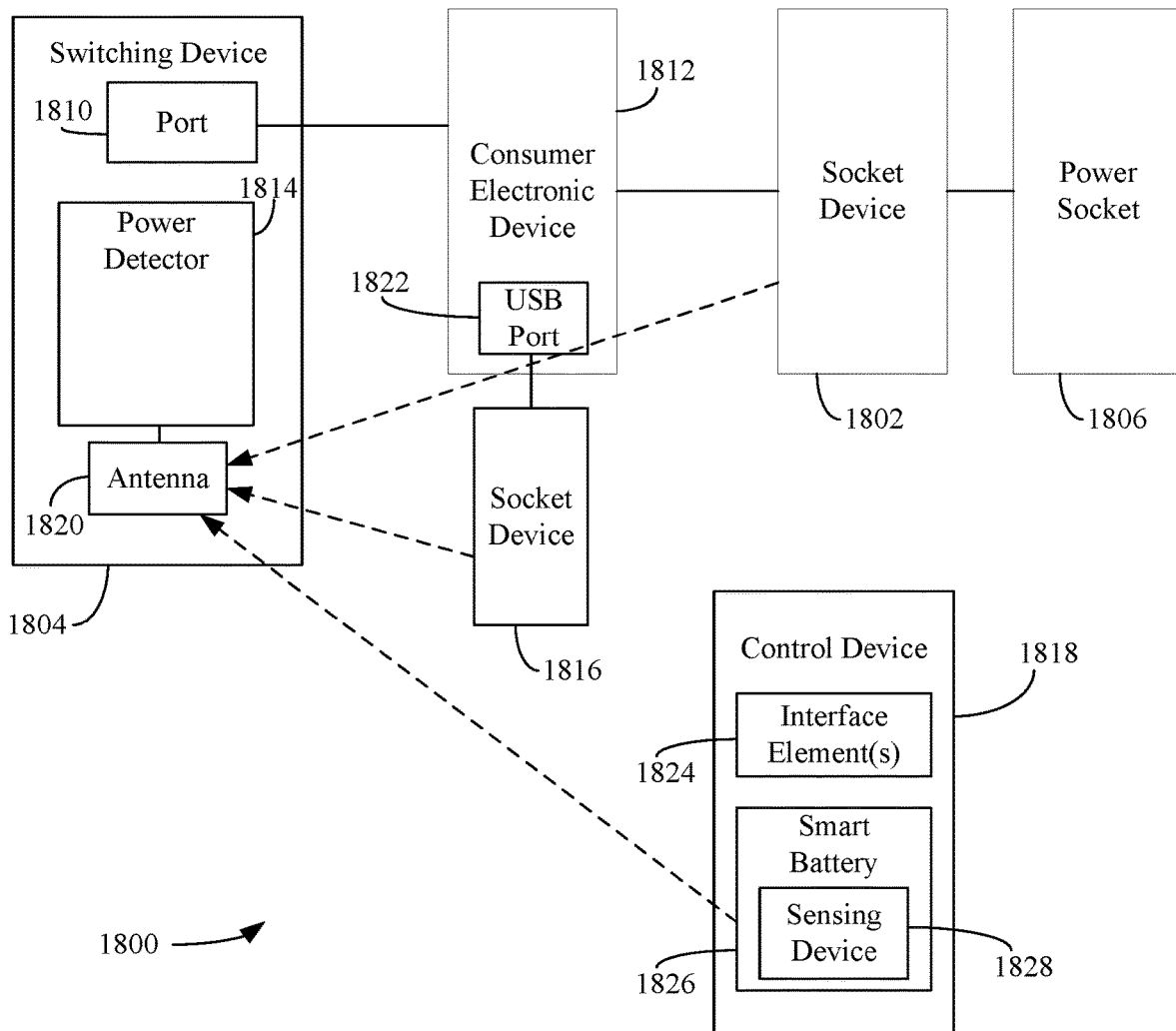
FIG. 18 is a block diagram of a system comprising a consumer electronic device, a socket device, a power socket, a socket device, a control device, and a switching device configured to perform control functions based on determined states, according to an exemplary embodiment.

In accordance with one or more embodiments, power detector 314 of FIG. 3 is configured to determine state characteristic(s) of a consumer electronic device. For instance, FIG. 17 depicts a flowchart 1700 of a method performed by a power detector of a switching device that determines state characteristic(s) for a consumer electronic device in accordance with an embodiment. In an embodiment, the method of flowchart 1700 may be implemented by a power detector 1814 included in a switching device 1804, as shown in FIG. 18. FIG. 18 shows a block diagram of a system 1800 comprising switching device 1804, a consumer electronic device 1812, a socket device 1802, a power socket 1806, a socket device 1816, and a control device 1818, according to an example embodiment. Switching device 1804 is an example of switching device 204, as shown in FIG. 2. Switching device 1804 comprises port 1810, power detector 1814, and an antenna 1820. Power detector 1814 is an example of power detector 314, as shown in FIG. 3. Other structural and operational embodiments will be apparent to persons skilled in the relevant art(s) based on the following discussion regarding flowchart 1700 and system 1800.

Flowchart 1700 begins with step 1702. At step 1702, an amount of current associated with or an amount of power consumed by the consumer electronic device is determined. For example, with reference to FIG. 18, a power plug of consumer electronic device 1812 may be connected to a socket device 1802, which in turn, is plugged into power socket 1806. Power socket 1806 is configured to provide power (e.g., alternating current (AC) power) to consumer electronic device 1812. Power socket 1806 may be integrated or fixed on equipment (e.g., an extension cable, a power strip, a table, a desk, etc.) or a building structure (e.g., an interior wall, an exterior wall, cabinetry, etc.) of a building. Power socket 1806 comprises one or more receptacles that are each adapted to receive a prong of another apparatus (e.g., an electrical plug of a power cord or socket device 1802). Power socket 1806 is configured to provide power to consumer electronic device 1812 upon insertion of the power plug of consumer electronic device 1812 into the receptacle(s) of power socket 1806. Socket device 1802 may be configured to determine an amount of current that is being provided to consumer electronic device 1812.

Socket device 1802 is configured to be coupled to (e.g., plugged into) power socket 1806. For example, socket device 1802 may comprise prong(s) that are configured to be inserted into receptacles of power socket 1806. Socket device 1802 is further configured to be coupled to a power cord that is coupled to consumer electronic device 1812. For example, a power plug of a power cord that is coupled to consumer electronic device 1812 may be configured to be plugged into socket device 1802. In this way, power may be provided from power socket 1806 to consumer electronic device 1812 via socket device 1802 and the power cord. That is, power from power socket 1806 is passed through socket device 1802 and the power cord and provided to consumer electronic device 1812.

Socket device 1802 is further configured to determine (e.g., measure) an amount of current provided to consumer electronic device 1812. For instance, socket device 1802 may comprise a sensing component (not shown) that is coupled to either a live wire configured to provide power to consumer electronic device 1812 when coupled to a corresponding prong of an electrical plug of a power cord that is coupled to consumer electronic device 1812 and a corresponding receptacle of power socket 1806 or a neutral wire configured to return power back to power socket 1806 when coupled to a corresponding prong of the electrical plug of the power cord and a corresponding receptacle of power socket 1806.

The sensing component may be configured to measure an amount of current being provided to consumer electronic device 306 via one of the live wire or neutral wire. In accordance with an embodiment, the amount of current is measured using a resistive element having a known resistance. For example, a shunt resistor may be coupled to one of the live wire or neutral wire. The sensing component may be configured to determine the voltage across the shunt resistor. In accordance with such an embodiment, the sensing component determines the amount of current being provided to consumer electronic device 1812 based on the determined voltage across the shunt resistor and the known resistance of the shunt resistor. In accordance with another embodiment, the sensing component comprises a current transformer. The current transformer may comprise a primary winding that is coupled to the live wire or the neutral wire and measures the amount of current provided thereby. The current transformer may also comprise a secondary winding that produces a current which is proportional to the current being measured by the primary winding. The current produced by the secondary winding is indicative of the amount of current being provided to consumer electronic device 1812. In accordance with yet another embodiment, the sensing component comprises a Hall effect current sensor. The Hall effect current sensor may be coupled to one of the live wire or the neutral wire and may be configured to measure a magnetic field generated the live wire or the neutral wire as current flows through the wire. The Hall effect current sensor provides an analog voltage output that is proportional to the strength of the magnetic field and current flowing through the wire. In accordance with such an embodiment, the sensing component determines a measure of the current being provided to consumer electronic device 1812 using the measured voltage.

Socket device 1802 may transmit an indication of the measured amount of current to power detector 1814. In accordance with an embodiment, socket device 1802 is configured to provide the indication via a wired connection (e.g., via a Universal Serial Bus (USB) cable, a coaxial cable, etc.). In accordance with another embodiment, socket device 1802 is configured to provide the indication to antenna 1820 via a wireless connection (e.g., via IR communication, RF communication, near field communication (NFC), or other RF-based communication technologies such as any of the well-known IEEE 802.11 protocols, etc.).

Power detector 1814 is configured to receive the indication from socket device 1802 and determine a power state of consumer electronic device 1812 based on the indication. It is understood that the current consumed by consumer electronic device 1812 varies based on the power state of consumer electronic device 1812. For example, when consumer electronic device 1812 is in a power-off state, the current provided to and/or consumed by consumer electronic device 1812 corresponds to a first amperage. When the consumer electronic device 1812 is in a standby state, the current provided to and/or consumed by consumer electronic device 1812 corresponds to a second amperage that is a greater than the first amperage. When the consumer electronic device 1812 is in a power-on state, the current provided to and/or consumed by the consumer electronic device 1812 corresponds to a third amperage that is a greater than the first amperage and the second amperage.

Power detector 1814 is configured to determine the power state of consumer electronic device 1812 by comparing the measured current represented by the received indication to one or more values or thresholds that each correspond to a particular power state. For example, power detector 1814 may be configured to determine whether the measured current is approximately equal to (or within a predefined range of) any of the first amperage, the second amperage and the third amperage to determine the power state of consumer electronic device 1812. As another example, power detector 1814 may be configured to determine whether the measured current is less than the second amperage (indicating the power-off state), greater than or equal to the second amperage and less than the third amperage (indicating the standby state), or greater than or equal to the third amperage (indicating the power-on state). Still other techniques may be used to determine the power state of consumer electronic device 1812 based on the first amperage, the second amperage and the third amperage.

The amount of power consumed by consumer electronic device may be determined via socket device 1816. Socket device 1816 is configured to be plugged into a port or connector of consumer electronic device 1812, such as a Universal Serial Bus (USB) port 1822. Accordingly, socket device 1816 may be a USB device (e.g., a dongle).

Consumer electronic device 1812 may be configured to provide an amount of power to socket device 1816 based on the power state of consumer electronic device 1812. Socket device 1816 may be configured to measure the amount of power received from consumer electronic device 1812. In accordance with an embodiment, upon measuring the amount of power, socket device 1816 may be configured to determine the power state of consumer electronic device 1812 based on the measured amount of power and transmit an indication of the determined power state to power detector 1814 via antenna 1820. The amount of power provided to socket device 1816 may vary depending on the type of port or connector to which socket device 1004 is coupled. For example, in accordance with a USB protocol, the amount of power provided to socket device 1816 when consumer electronic device 1812 is in a power-on state corresponds to an output voltage of 5 volts. When consumer electronic device 1812 is in a power-off state or a standby state, the amount of power provided to the socket device 1816 corresponds to an output voltage of zero. Accordingly, socket device 1816 may determine that consumer electronic device 1812 is in a power-on state by comparing the output voltage to a threshold. If the output voltage provided to socket device 1816 reaches the threshold (e.g., approximately five volts), socket device 1816 may determine that consumer electronic device 1812 is in a power-on state. If the output voltage is less than the threshold (e.g., approximately zero volts), socket device 1816 may determine that consumer electronic device 1812 is in a standby state or a power-off state.

Returning to FIG. 17, at step 1704, a power state is identified based on the determined amount of current or the determined amount of power. For example, with reference to FIG. 18, power detector 1814 may determine the power state based on the indication received from socket device 1802 and/or socket device 1816.

Additional details regarding determining an amount of current or power provided to a consumer electronic device may be found in U.S. patent application Ser. No. 14/945,201, filed on Nov. 18, 2015, and entitled "Automatic Detection of a Power Status of an Electronic Device and Control Schemes based thereon," the entirety of which is incorporated by reference.

In accordance with one or more embodiments, power detector 1814 is further configured to determine an operational state of consumer electronic device 1812. For example, power detector 1814 may be configured to receive power-related information from a control device configured to control consumer electronic device 1812 (e.g., control device 1818). For instance, control device 1818 may comprise one or more interface element(s) 1824 and a smart battery 1826. Each of interface element(s) 1824 may be configured to perform many functions when activated. Such functions may include, but are not limited to, selecting a consumer electronic device that an end user would like to control, enabling a user to enter a channel that the user would like to watch, enabling a user to control the volume of a consumer electronic device, enabling a user to activate and/or control a menu associated with a consumer electronic device, etc. Interface element(s) 1824 may be physical interface elements (e.g., buttons, sliders, jog shuttles, etc.) or virtual interface elements (e.g., icons, buttons, etc.) displayed via a capacitive touch display screen. Each of interface element(s) 1824, when interacted with by a user, causes a certain amount of power to be consumed from smart battery 1826. Each interface element(s) 1824 may cause a different amount of power to be consumed upon interaction thereof. This amount of power consumed is greater than the amount of power consumed when control device 1818 is in an idle state, that is, when control device 1818 is not being used by the user. Smart battery 1826 may include a sensing device 1828 that is configured to detect a variation in current flow of smart battery 1826. The variation in current flow may be used to determine power consumption at control device 1818 or may be processed and/or sent as information to power detector 1814 via antenna 1820 for further analysis. Smart battery 1826 may be inserted in control device 1818. Furthermore, smart battery 1826 may be paired with control device 1818 such that power detector 1814 may identify control device 1818 by a unique identifier (ID) associated with smart battery 1826.

Power detector 1814 is configured to identify a control device that has been interacted with based on the information received from control device 1818. Additionally, power detector 1814 may further identify interface element(s) 1824 that have been interacted with based on the received information. In particular, power detector 1814 may determine (e.g., infer) the operational state of consumer electronic device 1812 based on the information received from control device 1818. Control device 1818 may be an example of control device 1402, as shown in FIG. 14.

Additional details regarding determining the power consumption of a control device via a smart battery may be found in U.S. patent application Ser. No. 15/476,776, filed on Mar. 31, 2017, and entitled "Remote Control Device Usage Detection based on Power Consumption," the entirety of which is incorporated by reference.

Figure 19:
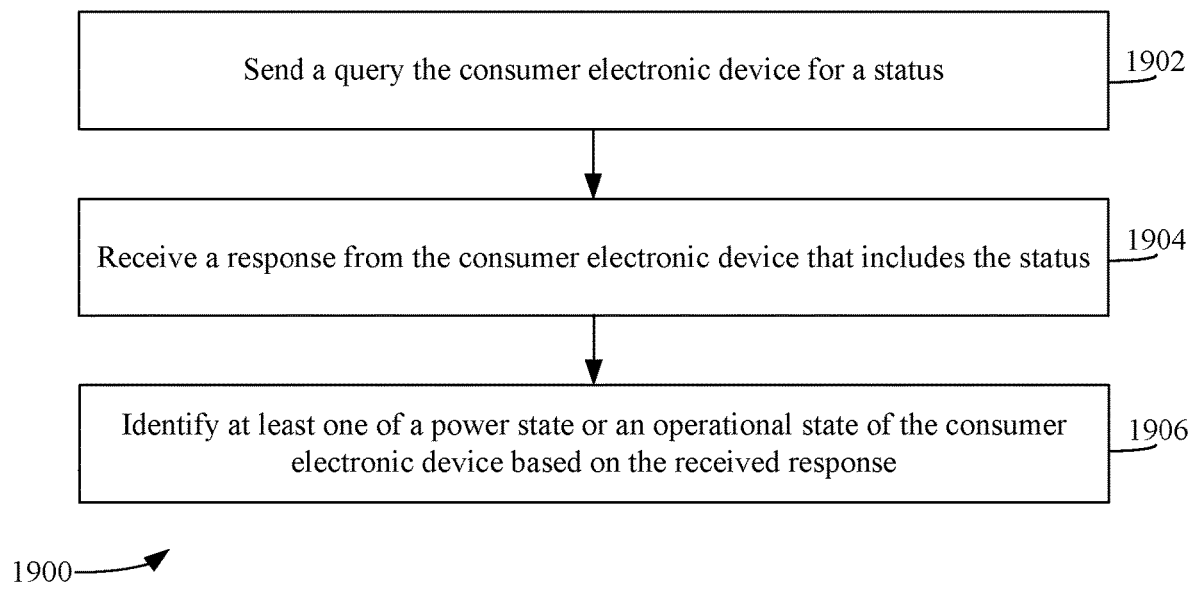
FIG. 19 is a flowchart of a method performed by a communication manager of a switching device that determines state characteristic(s) for a consumer electronic device, according to an exemplary embodiment.
Figure 20:
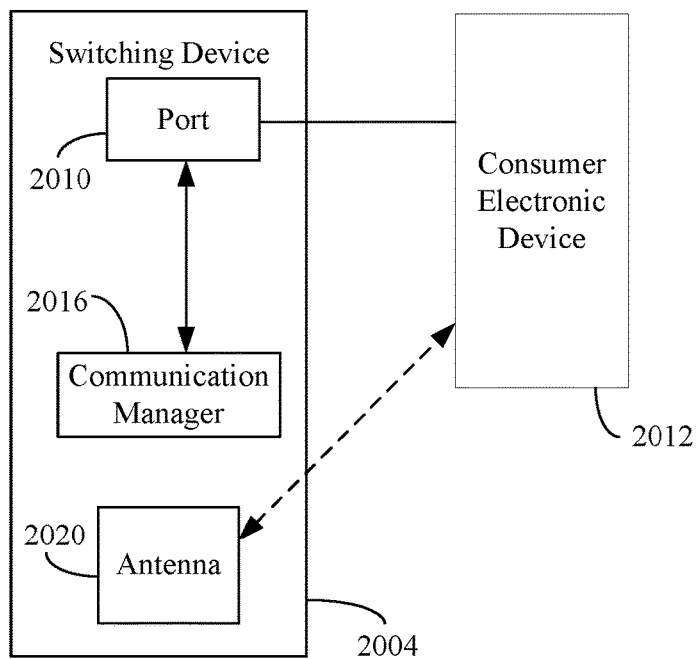
FIG. 20 is a block diagram of a system comprising a consumer electronic device and a switching device configured to perform control functions based on determined states, according to an exemplary embodiment.

In accordance with one or more embodiments, communication manager 316 of FIG. 3 is configured to determine state characteristic(s) of a consumer electronic device. For instance, FIG. 19 depicts a flowchart 1900 of a method performed by a communication manager of a switching device that determines state characteristic(s) for a consumer electronic device in accordance with an embodiment. In an embodiment, the method of flowchart 1900 may be implemented by a communication manager 2016 included in a switching device 2004, as shown in FIG. 20. FIG. 20 shows a block diagram of a system 2000 comprising switching device 2004 and a consumer electronic device 2012, according to an example embodiment. Switching device 2004 is an example of switching device 204, as shown in FIG. 2. Switching device 2004 comprises an HDMI port 2010, communication manager 2016, and an antenna 2020. Communication manager 2016 is an example of communication manager 316, as shown in FIG. 3. HDMI port 2010 is an example of one of ports 210, as shown in FIG. 2. Other structural and operational embodiments will be apparent to persons skilled in the relevant art(s) based on the following discussion regarding flowchart 1900 and system 2000.

Flowchart 1900 begins with step 1902. At step 1902, a query is sent to the consumer electronic device for a status. For instance, with reference to FIG. 20, communication manager 2016 may send a query to consumer electronic device 2012 via port 2010. In accordance with an embodiment, the query may be sent based on an HDMI-based protocol, such as CEC. In accordance with another embodiment, the query may be sent via antenna 2020 in accordance with an IP-based communication protocols and/or RF-based communication protocols.

At step 1904, a response is received from the consumer electronic device that includes the status. For instance, with reference to FIG. 20, communication manager 2016 may receive a response including the requested status from consumer electronic device 2012 via HDMI port 2010 in accordance with an HDMI-based protocol. Alternatively, the response may be received via antenna 2020 in accordance with an IP-based communication protocols and/or RF-based communication protocols.

At step 1906, at least one of a power state or an operational state of the consumer electronic device is identified based on the received response. For instance, with reference to FIG. 20, communication manager 2016 may identify at least one of a power state or an operational state of consumer electronic device 2012 based on the status included in the received response. In particular, the status may specify the power state and/or operational state in which consumer electronic device 212 is in.

IV. Further Example Embodiments and Advantages

One or more embodiments described herein may perform their functions according to the flowcharts described herein. Additional structural and operational embodiments will be apparent to persons skilled in the relevant art(s) based on the discussions regarding the flowcharts and embodiments herein. In some example embodiments, one or more of the steps of the described flowcharts may not be performed. Moreover, steps in addition to or in lieu of the steps of the described flowcharts may be performed (some of which were described above). Further, in some example embodiments, one or more of the steps of the described flowcharts may be performed out of the order shown or described, in an alternate sequence, and/or partially (or completely) concurrently with other steps.

The automatic state characteristics, state signatures and action determinations for consumer electronic devices coupled to HDMI switch embodiments and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

Figure 21:
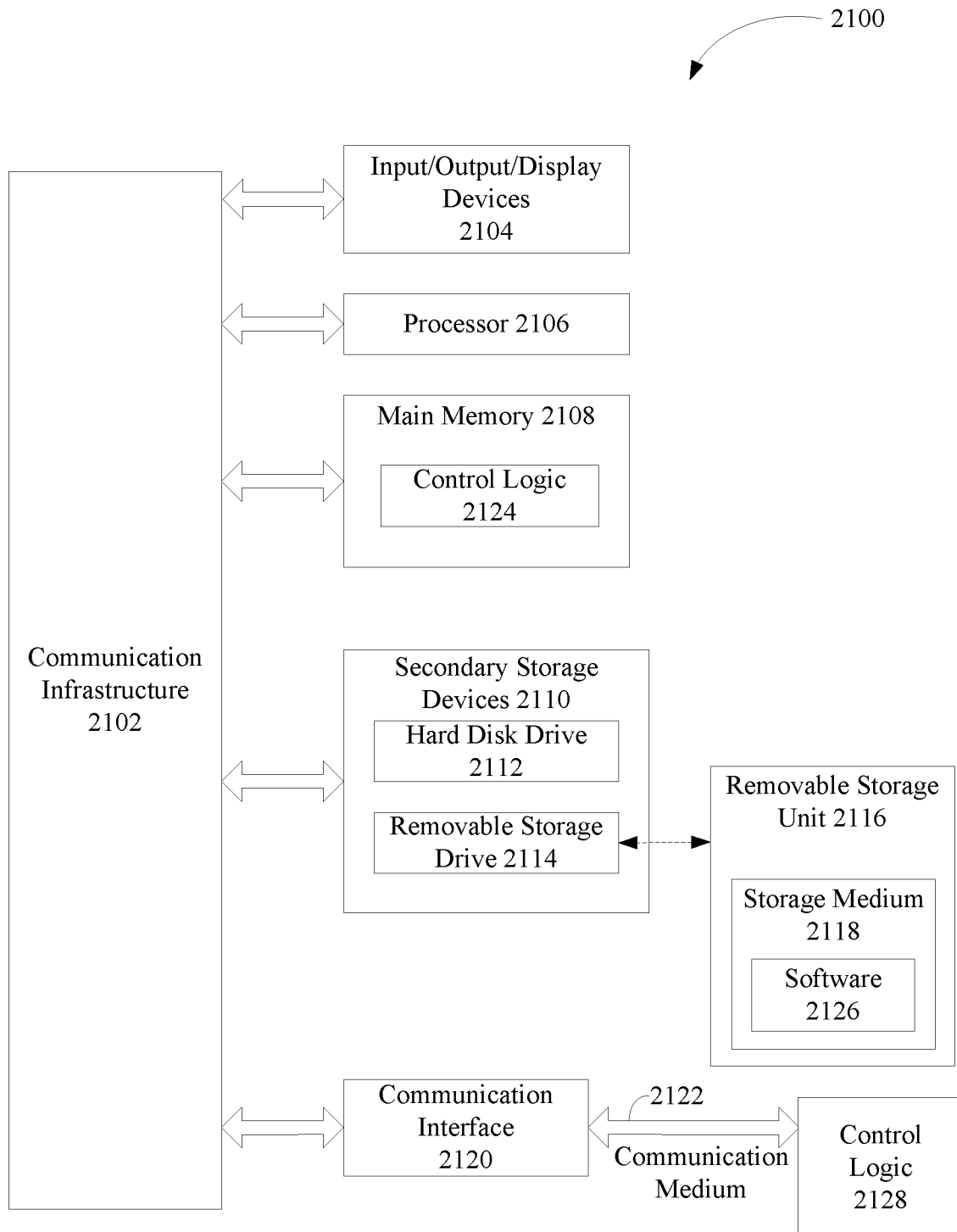
FIG. 21 is a block diagram of a computer system, according to an exemplary embodiment.

The embodiments described herein, including systems, methods/processes, devices, and/or apparatuses, may be implemented using well known processing devices, telephones (smart phones and/or mobile phones), tablet computers, servers, and/or, computers, such as a computer 2100 shown in FIG. 21. It should be noted that computer 2100 may represent communication devices, processing devices, servers, and/or traditional computers in one or more embodiments. For example, the automatic state characteristics, state signatures and action determinations for consumer electronic devices coupled to HDMI switch embodiments, and any of the sub-systems or components respectively contained therein, may be implemented using one or more computers 2100 or portions thereof.

Computer 2100 can be any commercially available and well known communication device, processing device, and/or computer capable of performing the functions described herein, such as devices/computers available from International Business Machines®, Apple®, Sun®, HP®, Dell®, Cray®, Samsung®, Nokia®, etc. Computer 2100 may be any type of computer, including a desktop computer, a server, etc.

Computer 2100 includes one or more processors (also called central processing units, or CPUs), such as a processor 2106. Processor 2106 is connected to a communication infrastructure 2102, such as a communication bus. In some embodiments, processor 2106 can simultaneously operate multiple computing threads.

Computer 2100 also includes a primary or main memory 2108, such as random access memory (RAM). Main memory 2108 has stored therein control logic 2124 (computer software), and data.

Computer 2100 also includes one or more secondary storage devices 2110. Secondary storage devices 2110 include, for example, a hard disk drive 2112 and/or a removable storage device or drive 2114, as well as other types of storage devices, such as memory cards and memory sticks. For instance, computer 2100 may include an industry standard interface, such a universal serial bus (USB) interface for interfacing with devices such as a memory stick. Removable storage drive 2114 represents a floppy disk drive, a magnetic tape drive, a compact disk drive, an optical storage device, tape backup, etc.

Removable storage drive 2114 interacts with a removable storage unit 2116. Removable storage unit 2116 includes a computer useable or readable storage medium 2118 having stored therein computer software 2126 (control logic) and/or data. Removable storage unit 2116 represents a floppy disk, magnetic tape, compact disk, DVD, optical storage disk, or any other computer data storage device. Removable storage drive 2114 reads from and/or writes to removable storage unit 2116 in a well-known manner.

Computer 2100 also includes input/output/display devices 2104, such as touchscreens, LED and LCD displays, monitors, keyboards, pointing devices, etc.

Computer 2100 further includes a communication or network interface 2118. Communication interface 2120 enables computer 2100 to communicate with remote devices. For example, communication interface 2120 allows computer 2100 to communicate over communication networks or mediums 2122 (representing a form of a computer useable or readable medium), such as LANs, WANs, the Internet, etc. Network interface 2120 may interface with remote sites or networks via wired or wireless connections.

Control logic 2128 may be transmitted to and from computer 2100 via the communication medium 2122.

Any apparatus or manufacture comprising a computer useable or readable medium having control logic (software) stored therein is referred to herein as a computer program product or program storage device. This includes, but is not limited to, computer 2100, main memory 2108, secondary storage devices 2110, and removable storage unit 2116. Such computer program products, having control logic stored therein that, when executed by one or more data processing devices, cause such data processing devices to operate as described herein, represent embodiments of the invention.

Techniques, including methods, and embodiments described herein may be implemented by hardware (digital and/or analog) or a combination of hardware with one or both of software and/or firmware. Techniques described herein may be implemented by one or more components. Embodiments may comprise computer program products comprising logic (e.g., in the form of program code or software as well as firmware) stored on any computer useable medium, which may be integrated in or separate from other components. Such program code, when executed by one or more processor circuits, causes a device to operate as described herein. Devices in which embodiments may be implemented may include storage, such as storage drives, memory devices, and further types of physical hardware computer-readable storage media. Examples of such computer-readable storage media include, a hard disk, a removable magnetic disk, a removable optical disk, flash memory cards, digital video disks, random access memories (RAMs), read only memories (ROM), and other types of physical hardware storage media. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, flash memory cards, digital video discs, RAM devices, ROM devices, and further types of physical hardware storage media. Such computer-readable storage media may, for example, store computer program logic, e.g., program modules, comprising computer executable instructions that, when executed by one or more processor circuits, provide and/or maintain one or more aspects of functionality described herein with reference to the figures, as well as any and all components, capabilities, and functions therein and/or further embodiments described herein.

Such computer-readable storage media are distinguished from and non-overlapping with communication media and transitory signals (do not include communication media and transitory signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media and signals transmitted over wired media. Embodiments are also directed to such communication media.

The techniques and embodiments described herein may be implemented as, or in, various types of devices. For instance, embodiments may be included, without limitation, in processing devices (e.g., illustrated in FIG. 21) such as computers and servers, as well as communication systems such as switches, routers, gateways, and/or the like, communication devices such as smart phones, home electronics, gaming consoles, entertainment devices/systems, etc. A device, as defined herein, is a machine or manufacture as defined by 35 U.S.C. § 101. That is, as used herein, the term "device" refers to a machine or other tangible, manufactured object and excludes software and signals. Devices may include digital circuits, analog circuits, or a combination thereof. Devices may include one or more processor circuits (e.g., central processing units (CPUs), processor 2106 of FIG. 21), microprocessors, digital signal processors (DSPs), and further types of physical hardware processor circuits) and/or may be implemented with any semiconductor technology in a semiconductor material, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

V. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A method performed by a high-definition multimedia interface (HDMI)-based switching device comprising a plurality of HDMI ports, comprising:
   determining state characteristics of a consumer electronic device that is communicatively coupled to the HDMI-based switching device via a first port of the HDMI ports and at least a first interface and second interface that are different than the HDMI ports, wherein the state characteristics are based on an analysis of:
      a video signal received via the first port to determine a playback state of the consumer electronic device,
      a voltage received via the first port,
      a radio frequency signal received via the first interface, and
      network data packets via the second interface;
   determining a state signature of the consumer electronic device based on the determined state characteristics;
   automatically identifying an action to be performed by the consumer electronic device from a plurality of actions based on the determined state signature and a data structure that comprises a state signature-to-action mapping, the state signature-to-action mapping specifying the action from the plurality of actions to be performed for the determined state signature; and causing the action to be performed with respect to at least one of the HDMI-based switching device or the consumer electronic device.

2. The method of claim 1, wherein said determining state characteristics of the consumer electronic device comprises:
detecting the voltage on a pin of the first port of the plurality of HDMI ports to which the consumer electronic device is coupled; and
identifying a power state of the consumer electronic device based on the detected voltage.

3. The method of claim 1, wherein said determining state characteristics of the consumer electronic device further comprises:
determining whether the consumer electronic device is playing back at least one of video content or audio content; and
identifying at least one of an operational state or a power state of the consumer electronic device based on the playing back determination.

4. The method of claim 1, wherein said determining state characteristics of the consumer electronic device further comprises:
detecting a voice command intended for the consumer electronic device; and
identifying at least one of an operational state or a power state of the consumer electronic device based on the detected voice command.

5. The method of claim 1, wherein said determining state characteristics of the consumer electronic device further comprises:
monitoring a network, to which the HDMI-based switching device and the consumer electronic device are communicatively coupled, for network data received by the consumer electronic device; and
identifying at least one of an operational state, a power state, or a communication state of the consumer electronic device based on said monitoring.

6. The method of claim 1, wherein said determining state characteristics of the consumer electronic device further comprises:
detecting a command sent to the consumer electronic device from a remote control device; and
identifying at least one of an operational state or a power state of the consumer electronic device based on the detected command.

7. The method of claim 1, wherein said determining state characteristics of the consumer electronic device comprises:
detecting the radio frequency signal from the consumer electronic device; and
identifying at least one of a power state, an operational state or a proximity state of the consumer electronic device based on the detected radio frequency signal.

8. The method of claim 1, wherein said determining state characteristics of the consumer electronic device further comprises:
determining an amount of current associated with or an amount of power consumed by the consumer electronic device; and
identifying a power state based on the determined amount of current or the determined amount of power.

9. The method of claim 1, wherein said determining state characteristics of the consumer electronic device further comprises:
sending a query to the consumer electronic device for a status;
receiving a response from the consumer electronic device that includes the status; and
identifying at least one of a power state or an operational state of the consumer electronic device based on the received response.

10. The method of claim 1, wherein the state signature of the consumer electronic device is based on at least one of:
a power state of the consumer electronic device;
a proximity state of the consumer electronic device to another device;
a communication state of the consumer electronic device; or
an operational state of the consumer electronic device.

11. The method of claim 1, wherein said causing the action comprises at least one of:
transmitting a toggle command to the consumer electronic device to toggle a power state of the consumer electronic device;
transmitting an operational command to the consumer electronic device that causes the consumer electronic device to perform an operation specified by the operational command;
automatically switching to an HDMI port of the plurality of HDMI ports to which the consumer electronic device is coupled; or
transmitting a notification message to the consumer electronic device.

12. An HDMI-based switching device, comprising:
a plurality of HDMI ports;
a characteristic identification component configured to determine state characteristics of a consumer electronic device that is communicatively coupled to the HDMI-based switching device via a first port of the HDMI ports and at least a first interface and second interface that are different than the HDMI ports, wherein the state characteristics are based on an analysis of:
a video signal received via the first port to determine a playback state of the consumer electronic device,
a voltage received via the first port,
a radio frequency signal received via the first interface, and
network data packets via the second interface;
a signature determination component configured to determine a state signature of the consumer electronic device based on the determined state characteristics; and
an action determination component configured to:
automatically identify an action to be performed by the consumer electronic device from a plurality of actions based on the determined state signature and a data structure that comprises a state signature-to-action mapping, the state signature-to-action mapping specifying the action from the plurality of actions to be performed for the determined state signature; and
cause the action to be performed with respect to at least one of the HDMI-based switching device or the consumer electronic device.

13. The HDMI-based switching device of claim 12, wherein the characteristic identification component comprises a signal detector configured to determine a state characteristic of the state characteristics, the signal detector configured to:
detect the voltage on a pin of the first port of the plurality of HDMI ports to which the consumer electronic device is coupled; and
identify a power state of the consumer electronic device based on the detected voltage.

14. The HDMI-based switching device of claim 12, wherein the characteristic identification component comprises an audio/video detector configured to determine a state characteristic of the state characteristics, the audio/video detector configured to:
- determine whether the consumer electronic device is playing back at least one of video content or audio content;
- identify at least one of an operational state or a power state of the consumer electronic device based on the determination.

15. The HDMI-based switching device of claim 12, wherein the characteristic identification component comprises a user input monitor comprising a microphone and is configured to determine a state characteristic of the state characteristics, the user input monitor configured to:
- detect, by the microphone, a voice command intended for the consumer electronic device; and
- identify at least one of an operational state or a power state of the consumer electronic device based on the detected voice command.

16. The HDMI-based switching device of claim 12, wherein the characteristic identification component comprises a network monitor, wherein the network monitor is configured to determine a state characteristic of the state characteristics, the network monitor configured to:
- monitor a network to which the HDMI-based switching device and the consumer electronic device are communicatively coupled for network data received by the consumer electronic device; and
- identify at least one of an operational state, a power state, or a communication state of the consumer electronic device based on said monitoring.

17. The HDMI-based switching device of claim 12, wherein the characteristic identification component comprises a remote signal detector, wherein the remote signal detector is configured to determine a state characteristic of the state characteristics, the remote signal detector configured to:
- detect a command sent to the consumer electronic device from a remote control device; and
- identify at least one of an operational state or a power state of the consumer electronic device based on the detected command.

18. The HDMI-based switching device of claim 12, wherein the characteristic identification component comprises a proximity detector, wherein the proximity detector is configured to determine a state characteristic of the state characteristics, the proximity detector configured to:
- detect the radio frequency signal from the consumer electronic device received via the first interface; and
- identify at least one of a power state, an operational state or a proximity state of the consumer electronic device based on the detected radio frequency signal.

19. The HDMI-based switching device of claim 12, wherein the characteristic identification component comprises a power monitor, wherein the power monitor is configured to determine a state characteristic of the state characteristics, the power monitor configured to:
- determine an amount of current associated with or an amount of power consumed by the consumer electronic device; and
- identify a power state based on the determined amount of current or the determined amount of power.

20. A system, comprising:
one or more processors; and
a memory containing computer-readable instructions, which, when executed by the one or more processors, is configured to perform operations in an HDMI-based switching device comprising a plurality of audio/video (AV) ports, the operations comprising:
- determining state characteristics of a consumer electronic device that is communicatively coupled to the HDMI switching device via a first port of the AV ports and at least a first interface and a second interface that are different than the HDMI ports, wherein the state characteristics are based on an analysis of:
  - a video signal received via the first port to determine a playback state of the consumer electronic device,
  - a voltage received via the first port,
  - a radio frequency signal received via the first interface, and
  - network data packets via the second interface;
- determining a state signature of the consumer electronic device based on the determined state characteristics;
- automatically identifying an action to be performed by the consumer electronic device from a plurality of actions based on the determined state signature and a data structure that comprises a state signature-to-action mapping, the state signature-to-action mapping specifying the action from the plurality of actions to be performed for the determined state signature; and
- causing the action to be performed with respect to at least one of the HDMI switching device or the consumer electronic device.

* * * * *